US012248598B2

(12) United States Patent
Mustafa

(10) Patent No.: US 12,248,598 B2
(45) Date of Patent: *Mar. 11, 2025

(54) DOMAIN DESCRIPTION LANGUAGE SYSTEM AND METHODS FOR DATA SUBJECT REQUEST (DSR) PROCESSING

(71) Applicant: CAPEIT.ai, Inc., San Jose, CA (US)

(72) Inventor: Tarique Mustafa, San Jose, CA (US)

(73) Assignee: Capeit.ai, Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/655,138

(22) Filed: May 3, 2024

(65) Prior Publication Data

US 2024/0289487 A1    Aug. 29, 2024

Related U.S. Application Data

(63) Continuation of application No. 18/457,677, filed on Aug. 29, 2023, now Pat. No. 12,008,133.

(Continued)

(51) Int. Cl.
G06F 21/62        (2013.01)
G06F 16/21        (2019.01)

(52) U.S. Cl.
CPC ........ G06F 21/6227 (2013.01); G06F 16/211 (2019.01); G06F 21/6245 (2013.01)

(58) Field of Classification Search
CPC . G06F 21/6227; G06F 21/6245; G06F 16/211
See application file for complete search history.

(56) References Cited

U.S. PATENT DOCUMENTS 11,586,762 B2    2/2023 Barday et al.
2013/0311166 A1*  11/2013 Yanpolsky ............ G06F 16/243
                                                    704/2

(Continued)

OTHER PUBLICATIONS

G. Hu and H. Fernandes, "Integration and querying of distributed databases," Proceedings Fifth IEEE Workshop on Mobile Computing Systems and Applications, Las Vegas, NV, USA, 2003, pp. 167-174, doi: 10.1109/IRI.2003.1251410. (Year: 2003).*

*Primary Examiner* — Robert B Leung
(74) *Attorney, Agent, or Firm* — Pillsbury Winthrop Shaw Pittman LLP

(57) ABSTRACT

Provided is a system and method for processing Compliance Data Subject Requests (DSRs) across a network by providing an executable planning model that contains a DSR domain description language, a DSR action description language, DSR problem templates, and predetermined logical, temporal, and dependency constraints. The DSR domain description language includes domains, with each domain including a domain name, and an object hierarchy representing various objects and their inter-relationship within each domain. The DSR action description language includes at least DELETE, REMOVE, OBFUSCATE, and ENCRYPT actions. The DSR problem templates each correspond to an operation that operates upon a compliance object within one of the domains, using at least one of the DSR actions. An instance of DSR processing may comprise receiving from a user DSR that includes a user object on which DSR processing is required and automatically processing the user DSR by executing the executable planning model.

20 Claims, 17 Drawing Sheets

Related U.S. Application Data

(60) Provisional application No. 63/474,615, filed on Aug. 29, 2022.

(56) References Cited

U.S. PATENT DOCUMENTS

| | | | |
|---|---|---|---|
| 2019/0325039 A1* | 10/2019 | Fernando | G06F 16/2365 |
| 2020/0159955 A1* | 5/2020 | Barlik | G06F 21/6245 |
| 2020/0233917 A1 | 7/2020 | Kurtanovic et al. | |
| 2021/0383370 A1 | 12/2021 | Tippets et al. | |
| 2022/0261493 A1 | 8/2022 | Klever | |
| 2022/0358240 A1 | 11/2022 | Neal et al. | |
| 2022/0382713 A1 | 12/2022 | Sadiq et al. | |
| 2022/0406208 A1 | 12/2022 | Ram | |
| 2023/0058870 A1 | 2/2023 | Huang et al. | |
| 2023/0381512 A1 | 11/2023 | Koch et al. | |

* cited by examiner

530

| |
|---|
| Delete_Field_Value(TableName, FieldName) <br>  Constraints:    FieldName,    F_ConstraintSETName <br>    F_ConstraintSETName :={Set of Constraints and Dependencies between Data Elements} |
| Delete_Row(TableName, FieldName, FieldValue/RowIdentifier) <br>  Constraints:    TableName,    T_ConstraintSETName <br>    T_ConstraintSETName :={Set of Constraints and Dependencies between Rows} |
| Delete_Table(DatabaseName, TableName) <br>  Constraints:    TableName,    Schema_ConstraintSETName <br>    Schema_ConstraintSETName :={Set of Constraints and Dependencies between Tables} |
| Remove_Field_Value(TableName, FieldName) <br>  Constraints:    FieldName,    F_ConstraintSETName <br>    F_ConstraintSETName :={Set of Constraints and Dependencies between Data Elements} |
| Remove_Row(TableName, FieldName, FieldValue/RowIdentifier) <br>  Constraints:    TableName,    T_ConstraintSETName <br>    T_ConstraintSETName :={Set of Constraints and Dependencies between Rows} |
| Remove_Table(DatabaseName, TableName) <br>  Constraints:    TableName,    Schema_ConstraintSETName <br>    Schema_ConstraintSETName :={Set of Constraints and Dependencies between Tables} |
| Obfuscate_Field_Value(TableName, FieldName) <br>  Constraints:    FieldName,    F_ConstraintSETName <br>    F_ConstraintSETName :={Set of Constraints and Dependencies between Data Elements} |
| Obfuscate_Row(TableName, FieldName, FieldValue/RowIdentifier) <br>  Constraints:    TableName,    T_ConstraintSETName <br>    T_ConstraintSETName :={Set of Constraints and Dependencies between Rows} |
| Obfuscate_Table(DatabaseName, TableName) <br>  Constraints:    TableName,    Schema_ConstraintSETName <br>    Schema_ConstraintSETName :={Set of Constraints and Dependencies between Tables} |
| Anonymize_Field_Value(TableName, FieldName) <br>  Constraints:    FieldName,    F_ConstraintSETName <br>    F_ConstraintSETName :={Set of Constraints and Dependencies between Data Elements} |
| Anonynmize_Row(TableName, FieldName, FieldValue/RowIdentifier) <br>  Constraints:    TableName,    T_ConstraintSETName <br>    T_ConstraintSETName :={Set of Constraints and Dependencies between Rows} |
| Anonymize_Table(DatabaseName, TableName) <br>  Constraints:    TableName,    Schema_ConstraintSETName <br>    Schema_ConstraintSETName :={Set of Constraints and Dependencies between Tables} |

| |
|---|
| Delete_KO_Type(KO_Value, FileName) |
|     Constraints:    FileName,    KO_LogicalConstraintSETName |
|         KO_LogicalConstraintSETName :={Set of Logical Constraints and Dependencies for KO_Elements} |
| Delete_KO_Type(KO_Value, FileName) |
|     Constraints:    FileName,    KO_RelationalConstraintSETName |
|         KO_RelationalConstraintSETName :={Set of Relational Constraints and Dependencies for KO_Elements} |
| Delete_KO_Type(KO_Value, FileName) |
|     Constraints:    FileName,    KO_TemporalConstraintSETName |
|         KO_TemporalConstraintSETName :={Set of Temporal Constraints and Dependencies for KO_Elements} |
| Remove_KO_Type(KO_Value, FileName) |
|     Constraints:    FileName,    KO_LogicalConstraintSETName |
|         KO_LogicalConstraintSETName :={Set of Logical Constraints and Dependencies for KO_Elements} |
| Remove_KO_Type(KO_Value, FileName) |
|     Constraints:    FileName,    KO_RelationalConstraintSETName |
|         KO_RelationalConstraintSETName :={Set of Relational Constraints and Dependencies for KO_Elements} |
| Remove_KO_Type(KO_Value, FileName) |
|     Constraints:    FileName,    KO_TemporalConstraintSETName |
|         KO_TemporalConstraintSETName :={Set of Temporal Constraints and Dependencies for KO_Elements} |
| Obfuscate_KO_Type(KO_Value, FileName) |
|     Constraints:    FileName,    KO_LogcalConstraintSETName |
|         KO_LogicalConstraintSETName :={Set of Logical Constraints and Dependencies for KO_Elements} |
| Obfuscate_KO_Type(KO_Value, FileName) |
|     Constraints:    FileName,    KO_RelationalConstraintSETName |
|         KO_RelationalConstraintSETName :={Set of Relational Constraints and Dependencies for KO_Elements} |
| Obfuscate_KO_Type(KO_Value, FileName) |
|     Constraints:    FileName,    KO_TemporalConstraintSETName |
|         KO_TemporalConstraintSETName :={Set of TemporalConstraints and Dependencies for KO_Elements} |
| Anonymize_KO_Type(KO_Value, FileName) |
|     Constraints:    FileName,    KO_LogicalConstraintSETName |
|         KO_LogicalConstraintSETName :={Set of Logical Constraints and Dependencies for KO_Elements} |
| Anonymize_KO_Type(KO_Value, FileName) |
|     Constraints:    FileName,    KO_RelationalConstraintSETName |
|         KO_RelationalConstraintSETName :={Set of Relational Constraints and Dependencies for KO_Elements} |
| Anonymize_KO_Type(KO_Value, FileName) |
|     Constraints:    FileName,    KO_TemporalConstraintSETName |
|         KO_TemporalConstraintSETName :={Set of Constraints and Dependencies for KO_Elements} |

FIG. 5C

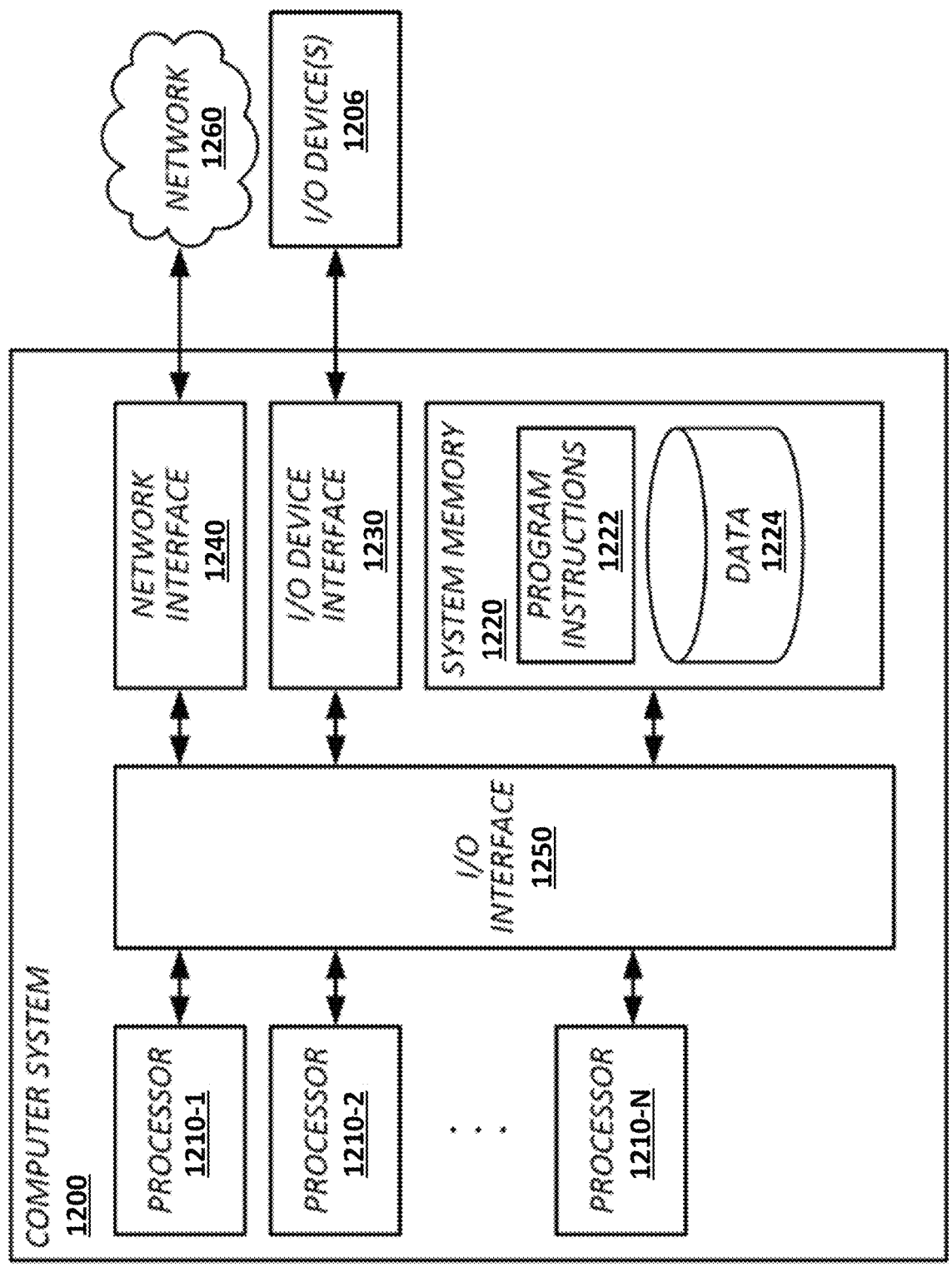

DOMAIN DESCRIPTION LANGUAGE SYSTEM AND METHODS FOR DATA SUBJECT REQUEST (DSR) PROCESSING

CROSS-REFERENCE TO RELATED APPLICATIONS

The present application is a continuation of U.S. patent application Ser. No. 18/457,677, filed on Aug. 29, 2023, which claims the benefit of U.S. Provisional Patent Application Ser. No. 63/474,615, filed Aug. 29, 2022. The entire contents of each afore-mentioned patent filings are hereby incorporated by reference.

BACKGROUND

1. Field

The present disclosure relates generally to computing, calculating, or counting, and more specifically to electrical digital data processing.

2. Description of the Related Art

Many entities (e.g., corporations, hospitals, banks, internet service providers, websites, etc.) collect user data—which may be a plethora of user data including name, credit card information, social security number, address, device identification, operating system, etc.—where user data may be collected on purpose (e.g., for identification purposes), with the user's knowledge (e.g., based on user input), or even incidentally or without a user's explicit permission (e.g., by a cookie in a web browser). As data storage and processing costs decrease, entities may turn user data into population wide statistics and run inferences on a plethora of user information, in order to advance the entities' goals. But an entity's goals may not be a user's goals—and user concern about the quantity, security, accessibility, and extent of data collected and maintained by entities has led to the advancement of user privacy and data rights, such as Health Insurance Portability and Accountability Act (HIPPA), Family Educational Rights and Privacy Act (FERPA), General Data Protection Regulation (GDPR) in the European Union (EU), California Consumer Privacy Act (CCPA) in California, etc. An entity may be obligated, including legally, to provide a measure of privacy—and even deletion—for user data it has collected. However, collected data may be stored in a diverse set of data repositories, which may have multiple dependencies within and between one another. Therefore, complying with data privacy requests may be complicated.

SUMMARY

The following is a non-exhaustive listing of some aspects of the present techniques. These and other aspects are described in the following disclosure.

Some aspects include a DSR domain description language, which may include DSR privacy actions. In some embodiments, the DSR domain description language may include a object type hierarchy or object hierarchy, which may organize dependencies among objects.

Some aspects include a DSR action description language, which may describe privacy actions in the data repository. In some embodiments, privacy actions may include at least one of DELETE, REMOVE, OBFUSCATE, ANONYMIZE, ENCRYPT, MARK NOT SHARE, MARK NOT USE, MARK NOT PROFILE, etc.

Some aspects include an action calculus for determining a set of actions for reaching a goal state based on an initial state. In some embodiments, the action calculus may account for logical constraints, temporal constraints, precedence relationships, etc.

Some aspects include a class of planning algorithms for determining action sequencing and selection for privacy actions. In some embodiments, the planning algorithms may operate on a forward chaining state space search. In some embodiments, the planning algorithms may operate backwards with dependency constraints and logical, relational or temporal heuristics.

Some aspects include generation of a DSR domain problem statement based on the DSR domain language.

Embodiments of the present disclosure provide a method for providing a user with access to Compliance Data Subject Request (DSR) processing across a domain comprising a network of servers that are administratively related and coupled, and user-accessible by each of a plurality of users, the servers in the network of servers each including memory for storing compliance data relating to Compliance Data Subject Requests and a processor for executing instructions, the method comprising: providing a executable planning model that comprises a DSR domain description language, a DSR action description language, a plurality of DSR problem descriptions, a plurality of predetermined logical, relational, and temporal constraints and a plurality of dependency constraints; wherein the DSR domain description language includes an object hierarchy representing various objects and their inter-relationship within the domain; wherein the DSR action description language includes DSR actions, the DSR actions comprising at least DELETE, REMOVE, OBFUSCATE, and ANONYMIZE, and at least one or more of ENCRYPT, MARK NOT USE, MARK NOT SHARE, AND MARK NOT PROFILE; and wherein the DSR problem descriptions each correspond to an operation that operates upon a compliance object using at least one of the DSR actions; receiving from one of the plurality of users at the network a user DSR request that includes therein a user object on which DSR processing is required; and automatically processing the user DSR request by executing the executable planning model in the network, and wherein the executable planning model automatically implements an automatically derived set of lower-level machine-executable atomic DSR actions corresponding to the user DSR request.

In an embodiment, providing the executable planning model further comprises describing the domain and the object hierarchy of the domain with the DSR domain description language.

In an embodiment, automatically processing the user DSR request comprises generating a DSR problem description based on the DSR domain language and the user DSR request.

In an embodiment, automatically processing the user DSR request comprises determining the set of lower-level machine-executable atomic DSR actions based on the DSR action language and the DSR problem description.

In an embodiment, automatically processing the user DSR request comprises automatically determining a sequential order of the set of lower-level machine-executable atomic DSR actions based a DSR action calculus.

In an embodiment, automatically determining a sequential order of the set of lower-level machine-executable atomic DSR actions based on a DSR action calculus comprises:

determining a set of lower-level machine-executable atomic DSR actions based on the DSR action language; and based on the plurality of predetermined logical, relational, and temporal constraints and the plurality of dependency constraints and the DSR action calculus, ordering the set of lower-level machine-executable atomic DSR actions.

In an embodiment, at least some of the plurality of predetermined logical, relational, and temporal constraints relate two or more of the set of lower-level machine-executable atomic DSR actions.

In an embodiment, automatically processing the user DSR request comprises automatically determining a set of DSR actions, wherein each of the DSR actions receives an object classification for the user object, and based on the DSR action and the object classification determining a set of constraints for the user object.

In an embodiment, the set of constraints for the user object are determined by the object classification, the plurality of predetermined logical, relational, and temporal constraints and the plurality of dependency constraints, and the action calculus.

In an embodiment, the set of constraints for the user object describe a relationship between the user object and other objects of the domain.

In an embodiment, the DSR action OBFUSCATE obeys a data privacy obfuscation mandate.

In an embodiment, the DSR action ANONYMIZE obeys a data privacy anonymization mandate.

In an embodiment, the DSR action REMOVE obeys a data privacy removal mandate.

In an embodiment, automatically processing the user DSR request comprises obeying a given data privacy mandate from a set of data privacy mandates, the set of data privacy mandates including at least one of General Data Protection Regulation (GDPR), Health Insurance Portability and Accountability Act (HIPAA), California Privacy Rights Act of 2020 (CPRA), California Consumer Privacy Act (CCPA), Children's Online Privacy Protection Rule (COPPA), Family Educational Rights and Privacy Act (FERPA), Gramm-Leach-Bliley Act (GLBA), Fair Credit Reporting Act (FCRA), and Digital Personal Data Protection Bill (DPDPB).

In an embodiment, the user DSR request comprises a data privacy mandate dependent user DSR request.

In an embodiment, further comprising displaying, to the plurality of users, a status for the processing of the user DSR request.

In an embodiment, the automatically derived set of lower-level machine-executable atomic DSR actions comprise multiple sets of lower-level machine-executable atomic DSR actions, each of the multiple sets associated with an actor, each actor having permissions for one or more of the network of servers, wherein the multiple sets are determined based on a relational map between the one or more of the network of servers and actors.

In an embodiment, further comprising sending as a workflow at least some of the set of lower-level machine-executable atomic DSR actions to an actor associated with at least one of the network of server, the actor having authorization to perform tasks for the at least one of the network of servers.

According to another embodiment, one or more non-transitory, machine-readable medium is provided having instructions thereon, the instructions when executed by a processor being configured to perform the method of any other embodiment.

According to another embodiment, a server is provided comprising memory for storing compliance data relating to Compliance Data Subject Requests (DSR); a processor; and one or more non-transitory, machine-readable medium having instructions thereon, the instructions when executed by a processor to: provide an executable planning model that comprises a DSR domain description language, a DSR action description language, a plurality of DSR problem descriptions, a plurality of predetermined logical, relational, and temporal constraints and a plurality of dependency constraints; wherein the DSR domain description language includes an object hierarchy representing various objects and their inter-relationship within a domain, the domain comprising a network of servers that are administratively related and coupled, and user-accessible by each of a plurality of users; wherein the DSR action description language includes at least DELETE, REMOVE, OBFUSCATE, ENCRYPT, and ANONYMIZE, and at least one or more of MARK NOT USE, MARK NOT SHARE, and MARK NOT PROFILE actions; and wherein the DSR problem descriptions each correspond to an operation that operates upon a compliance object using at least one of the DSR actions; receive from one of the plurality of users at the network a user DSR request that includes therein a user object on which DSR processing is required; and automatically process the user DSR request by executing the executable planning model in the network, and wherein the executable planning model automatically implements an automatically derived set of lower-level machine-executable atomic DSR actions corresponding to the user DSR request.

According to another embodiment, one or more system comprising a processor and one or more non-transitory, machine-readable medium is provided having instructions thereon, the instructions when executed by the processor being configured to perform the method of any other embodiment.

According to another embodiment, a system is provided comprising: one or more data store for storing compliance data relating to Compliance Data Subject Requests (DSRs); a compliance server, wherein the one or more data servers and the compliance server comprise a domain that is administratively related and coupled, and user-accessible by each of a plurality of users, the compliance server comprising: memory for storing compliance data relating to DSRs; a processor; and one or more non-transitory, machine-readable medium having instructions thereon, the instructions when executed by a processor to: provide an executable planning model that comprises a DSR domain description language, a DSR action description language, a plurality of DSR problem descriptions, a plurality of predetermined logical, relational, and temporal constraints and a plurality of dependency constraints; wherein the DSR domain description language includes an object hierarchy representing various objects and their inter-relationships within the domain; wherein the DSR action description language includes at least DELETE, REMOVE, OBFUSCATE, ENCRYPT, and ANONYMIZE, and at least one or more of MARK NOT USE, MARK NOT SHARE, and MARK NOT PROFILE actions; and wherein the DSR problem descriptions each correspond to an operation that operates upon a compliance object using at least one of the DSR actions; receive from one of the plurality of users at the domain a user DSR request that includes therein a user object on which DSR processing is required; and automatically process the user DSR request by executing the executable planning model in the domain, and wherein the executable planning model automatically implements an automatically derived set of lower-level machine-executable atomic DSR actions corresponding to the user DSR request.

BRIEF DESCRIPTION OF THE DRAWINGS

The above-mentioned aspects and other aspects of the present techniques will be better understood when the present application is read in view of the following figures in which like numbers indicate similar or identical elements:

FIGS. 5B-5C depict example constraints for various DSR actions, in accordance with one or more embodiments.

FIG. 11 illustrates an example computing system with which one or more embodiments may be implemented.

Figure 1:
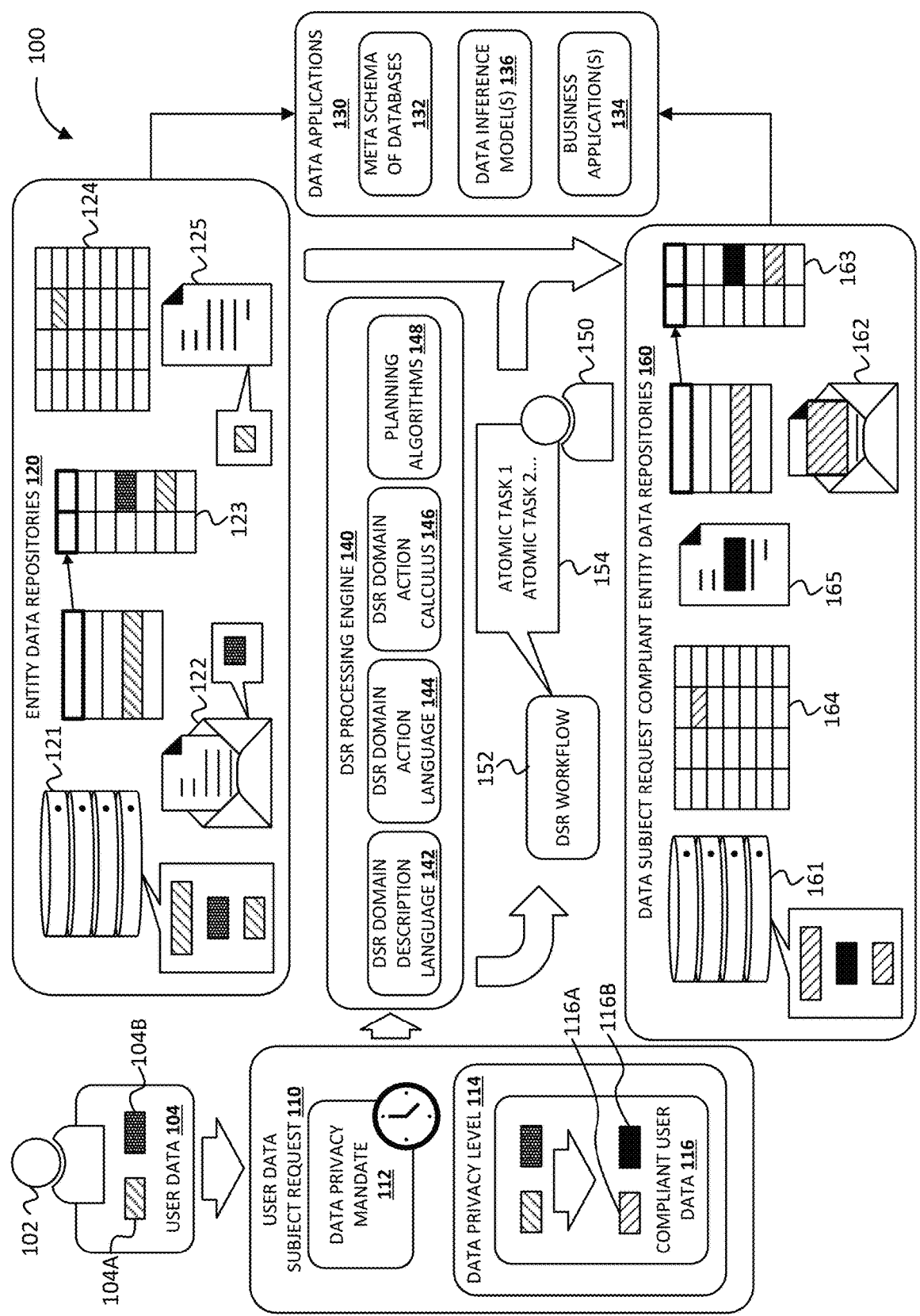
FIG. 1 depicts a schematic diagram showing an overview of AI planning based data subject request (DSR) processing, in accordance with one or more embodiments.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases just as importantly, recognize problems overlooked (or not yet foreseen) by others in the field of data privacy. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

As used herein, "optimal", "best", "quickest", "shortest" and other like superlatives may refer to something (e.g., a path, a solution, a set of actions, etc.) that corresponds to a result of a planning process, which may or may not include an optimization procedure, including through use of a global or local maximum or minimum. Optimal should not be taken as limiting an object to only the absolute best or any other superlative for all possible paths, operations, actions of said object. It should be understood that optimal may refer to a best iteration (e.g., of a solution, path, etc.) such as can be practically described by limitations of computational power, accuracy, reproducibility, time, etc. Multiple things, including multiple instances of the same item or instances of different items, may be identified as optimal in some embodiments. In some embodiments, further determination may be used to choose a most optimal object from among a set of objects identified as optimal.

FIG. 1 depicts a schematic diagram 100 showing an overview of artificial intelligence (AI) planning based data subject request (DSR) processing. The schematic diagram shows a user 102, who may be a human or in some cases may be a corporate, legal, educational, etc. entity (for example, a set of multiple users from a university sharing a log in to an external library). The user 102 may have associated user data 104. The user data 104 may be known to the user (for example, a username, a user address, etc.). In some embodiments, the user data 104 may be data the user does not know, such as a class ranking in a gradebook repository, a unique identifier in a medical office database, confidential evaluations of the user 102 by an employer, etc. The user data 104 may be data the user has consented to being acquired (e.g., such as through a website user agreement, by enrollment in an educational institution, etc.). The user data 104 may include inferred information, or user data generated based on acquired user data (e.g., a second layer of user data). For example, a user physical fitness score may be determined based on multiple user performance scores (for example, in a stress test, a timed run, etc.) and measurements (for example, height, weight, body mass index (BMI), etc.) The user data 104 may be any data associated with the user 102 stored by an entity. The entity may be any enterprise, educational institution, medical institution, service provider, etc. that collects user data or operates an entity data repository 120. The user data 104 may be shared between entities, such as related entities, purchased from one entity by another entity, etc. The user data 104 may include user data which is protected, such as by encryption, including within the entity or in external facing applications. The user data 104 may include de-identified data. The user data 104 may include re-identified data, e.g., user data 104 which was de-identified then re-associated with a user or class of users such as by inference. Re-identified data may have a probability of re-identification (e.g., of correct re-identification) associated with the data or the user to which it is assigned. The user data 104 may include user data 104 which the user 102 believes the entity is in possession of, but which may or may not actually be possessed by the entity. For example, the user 102 may perform actions based on user data 104 which the entity does not actually possesses, such as user data 104 the entity did not collect (for example, birthdate) or user data 104 the entity has collected but no longer possess (e.g., user data 104 which has already been deleted from a database, such email-based data which has been deleted due to an entity email storage threshold-based purge). The user data 104 may contain different types of user data, such as user data 104A and user data 104B, which may be subject to different types of requests by the user 102.

The user 102 may submit to an entity a data subject request (DSR) 110, which may be a request for removal of at least some part of the user data 104 from an entity's possession. The user 102 may submit a data subject access request (DSAR), which may be a request for identification of which pieces of the user data 104 is in an entity's possession. Hereinafter, references to DSR encompass DSAR, which may be considered as a DSR request to identify with or without a request to remove user data. The user DSR 110 may indicate a legal, regulatory, university policy, etc. or other data privacy mandate 112 under which the DSR is to be implemented. Various data privacy mandates 112 may require different levels of data removal, such as encryption (e.g., restriction of access), anonymization, deletion, etc. Various data privacy mandates 112 may require time horizons. For example, some privacy mandates 112 may require that a DSR be processed in 2 weeks, 1 month, etc. The user DSR 110 may indicate a level of data privacy 114 to be applied to the user data (e.g., a level of data scrubbing, a level of data removal, a level of obfuscation, etc.). The level of data privacy 114 may be constrained to be the different levels of data privacy required by any applicable data privacy mandate 112. The entity may be obligated, including legally, to provide different levels of data privacy based on the various data privacy mandates 112 to which it is subject. For example, under HIPAA, the user DSR 110 may request that an SSN be encrypted in a hospital server (or otherwise access restricted), but may not require that the SSN be deleted. The level of data privacy 114 selected by the user 102 submitting the user DSR 110 may also vary based on the type of user data 104. For example, a user DSR 110 may request that browser history be deleted (e.g., from a service provider), but may only request that a user identity be obfuscated. The user DSR 110 may indicate different levels of removal for various pieces of user data 104. For example, the user DSR 110 may indicate that user data 104A is to be obfuscated-replaced by obfuscated user data 116A—while user data 104B is to be deleted-replaced by null user data 116B.

An entity that collects user data, including user data 104, may store the user data, and data of a plurality of users, in various entity data repositories 120. The entity data repositories 120 may be stored in physical servers, on the cloud, in mainframes, etc. The entity data repositories 120 may be accessible by entity operators (e.g., employees, contractors, etc.), such as by logging into an entity system or application. The entity data repositories 120 may be in communication with one another, or may be communicationally distinct. The entity data repositories 120 may contain multiple different types of data storage, such as databases 121 (e.g., SQL databases, myDB, etc.), written data (such as emails 122, word processing documents 125, natural language processing (NLP) processed records, etc.), spreadsheets, schema 123, tables 124, etc. The entity data repositories 120 may include multiple versions, such as a production version and a test version, of one or more repositories. The entity data repositories 120 may be static (or relatively static) or may be updated, including on the order of once a day, once an hour, continuously, etc. The user data may be stored, including in duplicative entries, in one or more locations in the entity's data repositories 120. For purposes of the present disclosure, it is assumed that the locations of the user data in the entity's data repositories is known. The databases of the entity data repositories 120 may have connections, including dependencies. For example, data may be contained in a star schema, in which a unique identifier is used as a private key. The unique identifier may be user data, such as a SSN, which the user may request to and have a right to have deleted from the entity data repository. Deletion of the SSN or other private key may cause failure of schema, other tables which pull from a table using the private key, etc. Deletion of a first piece of user data may also make it difficult to locate other pieces of user data, where deletion of a field may destroy a relationship between tables in a schema.

Entity data repositories 120 may use private keys, foreign keys, composite keys, compound key, unique identifiers, etc. to relate various fields, rows, tables, and other objects of one or more of the entity data repositories 120. The relationships between the entity data repositories 120 may be listed in (or controlled by) a meta schema of databases 132.

The entity may operate one or more data application 130 based on the entity data repository 120, which may include a business application 134 (for example, credit card processing software which may process recurring payments for a monthly service), one or more data inference model 136 (for example, an advertising inference model which may identify users likely to respond favorably to a mailed advertisement), the meta schema of databases 132 (e.g., a map of the relational connections between databases of the entity data repositories), etc. The entity, who has built these data applications 130, has a vested interest in their continued viability after the user data is deleted (or the user DSR is otherwise processed). In order to both process DSR requests—in compliance with regulatory requirements—and to preserve entity data applications, a DSR processing engine 140 may be used.

The DSR processing engine 140 may contain a DSR domain description language 142, which may be used to characterize the entity data repositories and DSR request, a DSR domain action language 144, which may be used to characterize atomic actions and dependencies for fulfillment of the DSR request, a DSR domain action calculus 146, which may be used to determine an order of actions, and DSR executing planning algorithm 148, which may search the planning space to determine a sequence of actions and actors to perform those actions. The DSR domain description language 142 and the DSR domain action language 144 may use elements of DSR specific language CAPELANG. Reference herein to the DSR domain description language 142 and to the DSR domain action language 144 should be understood to encompass application of CAPELANG to a domain description or action. References to CAPELANG should be understood to encompass application of CAPELANG to domain description, action description, problem description, etc. Various actions are described in CAPELANG, which should be understood to be an exemplary set, where additional actions may be described. CAPELANG may operate on objects via a complier, where compiler used may be dependent on the type of object on which CAPELANG is operating.

Based on the DSR processing engine 140, a set of ordered tasks (such as per data repository and DSR request) may be generated, which when performed will fulfill the user DSR 110. The set of ordered tasks may be assigned, as a workflow 152, a sequence of atomic tasks 154, etc., to an actor 150 (e.g., a human actor, a program actor, etc.) to perform based on a map of the permissions (e.g., actor custodianship's) for the entity's various data repositories 120. An atomic task, also referred to as a primitive task, may be an item which may be performed without regard to other dependencies, other than the workflow sequence. For example, deletion of a field which forms a composite key for another table may be a non-atomic (e.g., non-primitive) task, as the task involves dependencies. The deletion of a row may be broken down into multiple atomic tasks: for example, (1) generate obfuscated unique identifier (2) use obfuscated unique identifier in related tables (3) change composite key to unique identifier primary key (4) delete field which was previously part of composite key. These are provided as examples only, and may instead be any other appropriate atomic tasks. The performance of the actor workflow may be monitored and adjusted via a dashboard, which may display atomic tasks performed, remaining to be performed, unable to be performed, errors, completions, etc.

Based on application of the DSR processing engine 140 (and the actor workflows 152) the entity data repositories 120 may become DSR compliant entity data repositories 160. The DSR compliant data repositories may contain obfuscated, anonymized, encrypted, etc. data (e.g., compliant user data 116) instead of the previous user data 104. The DSR compliant entity data repositories 160 may contain the same types of data storage as the entity data repositories 120, but with removed, obfuscated, anonymized, etc. data, such as shown in databases 161 (e.g., SQL databases, myDB, etc.), written data (such as emails 162, word processing documents 165, natural language processing (NLP) processed records, etc.), spreadsheets, schema 163, tables 164, etc which contain compliant user data 116 (e.g., obfuscated user data 116A and null user data 116B) instead of user data 104. The DSR compliant entity data repositories 160 may have fewer entries that the entity data repositories 120, such as if fields, tables, rows, columns, etc. are deleted during processing of the user DSR 110. The DSR compliant entity data repositories 160 may otherwise be the same as the entity data repositories 120—that is, have the same inter-relationships and other characteristics. The DSR compliant entity data repositories 160 may support the data applications 130, such as by preserving collected data where possible and preserving relationships between databases, tables, etc. in the entity data repositories even after providing privacy (e.g., the meta schema of databases 132).

Figure 2:
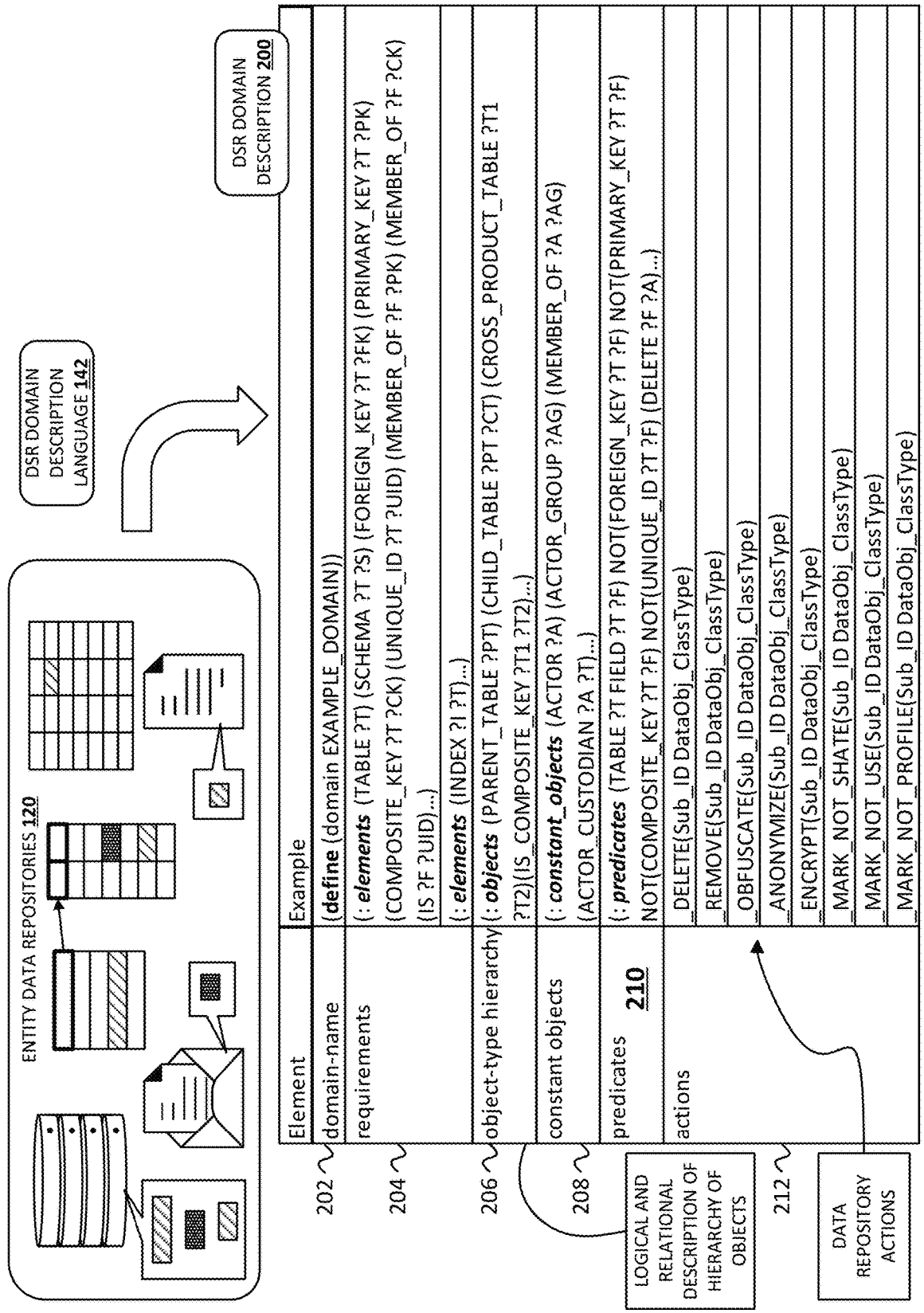
FIG. 2 depicts a schematic diagram showing an example of a DSR domain description language applied to an entity's data repositories, in accordance with one or more embodiments.

FIG. 2 depicts a schematic diagram showing an example of a DSR domain description language 142 applied to an entity's data repositories 120. According to an embodiment of the present disclosure, the environment (e.g., domain) of the data repositories and the relationship between individual of the data repositories may be described using the DSR domain description language (e.g., CAPELANG) as a DSR domain description. The description of the interrelationships between the data repositories in a DSR domain description 200 allows for application of the DSR action language (e.g., CAPELANG) to process a user DSR.

The DSR domain description 200 may have the following elements: domain-name 202, requirements 204, object-type hierarchy 206, constant objects 208, predicates 210, and actions 212. The domain-name 202 may be the name of the domain within an entity's data repositories. An entity may have multiple domains, which may have different domain-names 202. Multiple domains may be interacting or non-interacting. For example, a first domain may be a production domain while a second domain may be a test domain. Changes to the production domain may be reflected by corresponding changes to the test domain, while changes to the test domain may not be reflected in corresponding changes to the production domain. A domain may be divided into sub-domains, such as with individual domain-names and individual object-type hierarchies. For example, an entity, such as a hospital, may have a first domain subject (such as medical records) to a first data privacy mandate (such as HIPAA) and a second domain (such as credit card payment records) not subject to the first data privacy For DSR domain descriptions 200 which operate entirely within a domain, the domain-name may be taken as a given (e.g., for domain descriptions deployed exclusively to within a single domain) and may not be part of the DSR domain description 200. For example, for a DSR domain description 200 of databases on an air-gapped SQL server, the domain-name may be null (e.g., the domain-name 202 may be defined as "domain" ("(define (domain))"). The domain name may be defined in any appropriate manner and may be defined in relation to specific data repositories.

The requirements 204 may be (or list) the elements that the DSR processing engine may operate upon. The domain may include elements which are not operated upon by the DSR processing engine (e.g., the DSR processing engine 140 of FIG. 1) and which may or may not be listed in the requirements 204. For example, the domain may include code or other objects which operate on one or more data repository (and which may be stored in a data repository), but which may not contain any user data and may not be subject to DSRs. The requirements 204 may include elements which have both a name and a type. The requirements 204 may include elements of different types, including elements which may or may not be related to one another by a single schema. For example, the requirements 204 may include tables with fields (e.g., related elements) and knowledge objects (KOs) in files, where the tables and the KOs may or may not be related (across type) to each other by a schema (or other logical, relational, or temporal dependency). In some embodiments, the requirements 204 may list elements which are members of another element. In some embodiments, the requirements 204 may list sub-elements of a data repository (e.g., fields within a table). In some embodiments, the requirements 204 may list an element (e.g., a table) and thereby include each sub-element within the element (e.g., fields in the table) without listing the sub-elements. In some embodiments, the requirements 204 may be updated, such as if elements are added, removed, etc. from the domain.

The object-type hierarchy 206 may be a class-hierarchy of the objects in the domain (e.g., of domain-name 202). The object-type hierarchy 206 may include relationships between elements of the requirements 204. The object-type hierarchy 206 may describe attributes of the elements of the requirements 204. The object-type hierarchy 206 may describe relationships between elements of the requirements 204 in relation to a schema. The object-type hierarchy 206 may identify sub-element of the elements of the requirements 204 and describe relationships between sub-elements, their own elements, other elements, sub-elements of other elements, etc. For example, the object-type hierarchy 206 may describe relationships between fields of a first table and fields of a second table, rows of a first table and a second table, etc. The object-type hierarchy may describe characteristics of elements, such as identifier status (is the element a user ID, unique ID, etc.), key status (is the element part of a private key, composite key, etc.), relationships between elements (a first table is a parent table, child table, cross product table, etc. of another table), schema (e.g., how various tables are related to one another), etc. The object-type hierarchy 206 may describe substantially all elements of the requirements 204. In some embodiments, the object-type hierarchy 206 may describe those of the elements of the requirements 204 which are interrelated (e.g., which have dependencies on one another) and may not describe those elements of the requirements 204 which are not interrelated (for example, a vendor ID table and a customer ID table may or may not be related or may be related through other tables, such as a customer purchase database). In some embodiments, the elements of the requirement 204 may be described multiple interrelations, which may be included in a single object-type hierarchy 206. The object-type hierarchy 206 may be a logical and relational description of the hierarchy of the elements in the domain. In some embodiments, the object-type hierarchy 206 may include a temporal description of the hierarchy of the elements of the domain.

The constant objects 208 may be objects which are present in the domain, but which may not be include in the object-type hierarchy, may not include user information, etc. The constant objects 208 may be any appropriate objects for which initialization is useful when describing the domain, a problem in the domain, an action in the domain, etc. For example, the constant objects 208 may be internal information (e.g., not user information) which may identify the actors able to make changes in each data repository or element of the domain. The constant objects 208 may be actor to who atomic tasks may be assigned, workflow control items, etc. The constant objects 208 may be interrelated or related to elements of the requirements 204. For example, a table of the requirements 204 may be associated with an actor of the constant objects 208, who is the actor with permission to alter the table.

The predicates 210 may be templates for determining characteristics of various elements. The predicates may be templates (such as Boolean expressions) which may be compared against elements and their characteristics to return information about the elements. For example, the predicates 210 may include true or false determination, identification determination, NOT based determination (for example, field1 is NOT an element of table2), etc. The predicates 210 may be element type dependent. That is, some of the predicates 210 may be applicable to only some of the types of elements of the requirements 204 or may be applied in different ways based on the element to which they are applied. For example, NOT (UNIQUE_ID) may be applied to a field (e.g., determine if a given field is a unique ID or not or, in some embodiments, may be applied to a table (e.g., to determine if any field of the table is a unique ID). The predicates 210 may be defined in the DSR domain description 200 for the domain. The predicates 210 may include predicates which are not used in a particular DSR domain (e.g., may be a set of global predicates which describe various actions in the general DSR domain).

The actions 212 may be actions which are described for the data repository. The actions 212 may include DELETE, REMOVE, OBFUSCATE, ANONYMIZE, ENCRYPT, MARK (including MARK_NOT_SHARE, MARK_NOT_USE, MARK_NOT_PROFILE, etc.). The actions 212 may take parameters, such as element name (e.g., subject ID or Sub_ID) and an element type (e.g., element class type or DataObj_ClassType). The parameters of the actions 212 may be instantiated with the elements (e.g., of the requirements 204). The actions 212 may be a larger or smaller group. Some of the actions 212 may obey requirements one or more data privacy mandate (e.g., the data privacy mandate 112 of FIG. 1). For example, ENCRYPT may be an encryption of a certain level, for example, as required by a data privacy mandate. In another example, ANONYMIZE may be an anonymization to a certain level of anonymity (e.g., removal of personally identifying information, removal of group identity information, etc.), such as required by a data privacy mandate. In another example, OBFUSCATE may be an obfuscation to a certain level of information removal, such a level of obfuscation which removes the ability to perform one or more inference, such as to satisfy a given data privacy mandate. Some of the actions 212 may include application of stochastic noise, encryption protocols, etc. Some of the actions 212 may be considered to be subsets of others of the actions 212. For example, the action REMOVE may be considered an action of which DELETE, OBFUSCATE, ANONYMIZE, ENCRYPT, etc. are subsets. REMOVE may be an action which removes data from an element, such as by deletion (e.g., of a field, of a row, of a table, etc.), by replacement (e.g., with random data, with obfuscated data, with an anonymized version of the data, etc.). DELETE may be an action which replaces data with a null field (e.g., an empty field), removes a ROW, etc. DELETE may delete a field without disturbing other fields in a row, table, column, etc., such as by replacing a field with a null field (and likewise for other elements). DELETE may replace data with nonce terms (e.g., data "DATA" may be replaced by "0," "000," "NULL," "XXX," etc.). REMOVE may remove data with or without replacement. In some embodiments, REMOVE may be an action which obeys a data privacy mandate. In some embodiments, DELETE may be an action which obeys a data privacy mandate (e.g., the same or a different data privacy mandate which REMOVE satisfies). In some embodiments, fewer than the actions 212 listed may be used. In some embodiments, all of the actions 212 may be present. In some embodiments, DELETE and REMOVE may be present and may have different meanings, atomic actions, etc. The DSR domain description 200 may describe actions 212 which may or may not be used in a DSR domain problem description.

The actions 212 may be conditional actions. The actions 212 may have preconditions, which may be conditions under which a given action may operate. If the precondition is not met, the action 212 may be blocked for occurring. The actions 212 may have effects, which may be conditions which occur after a given action has operated. The actions 212 may have conditional effects, such as effects which occur based on certain preconditions (e.g., when-effects).

The DSR domain description 200 may be stored in the domain (e.g., in an element of the domain-name 202, an element of the requirements 204, etc.). The DSR domain description 200 may be stored in a DSR processing server or server which processes DSRs, which may or may not be part of the domain. The DSR domain description 200 may be manually generated. The DSR domain description 200 may be automatically generated, such as based on a software module which may identify elements of the domain, hierarchy among the elements, etc. The DSR domain description 200 may be updated based on any updates to the domain (e.g., through push or pull update triggering). The DSR domain description 200 may be updated or checked against the domain and the domain hierarchy at intervals, such as once a day, once a month, etc. The DSR domain description 200 may include many instances of requirements 204, constant objects 208, or other elements, such as 10s of elements, 100s of elements, 1000s of elements, 100,000 elements, etc. The DSR domain description 200 may include additional actions 212, including other SQL or database language actions.

Figure 3A:
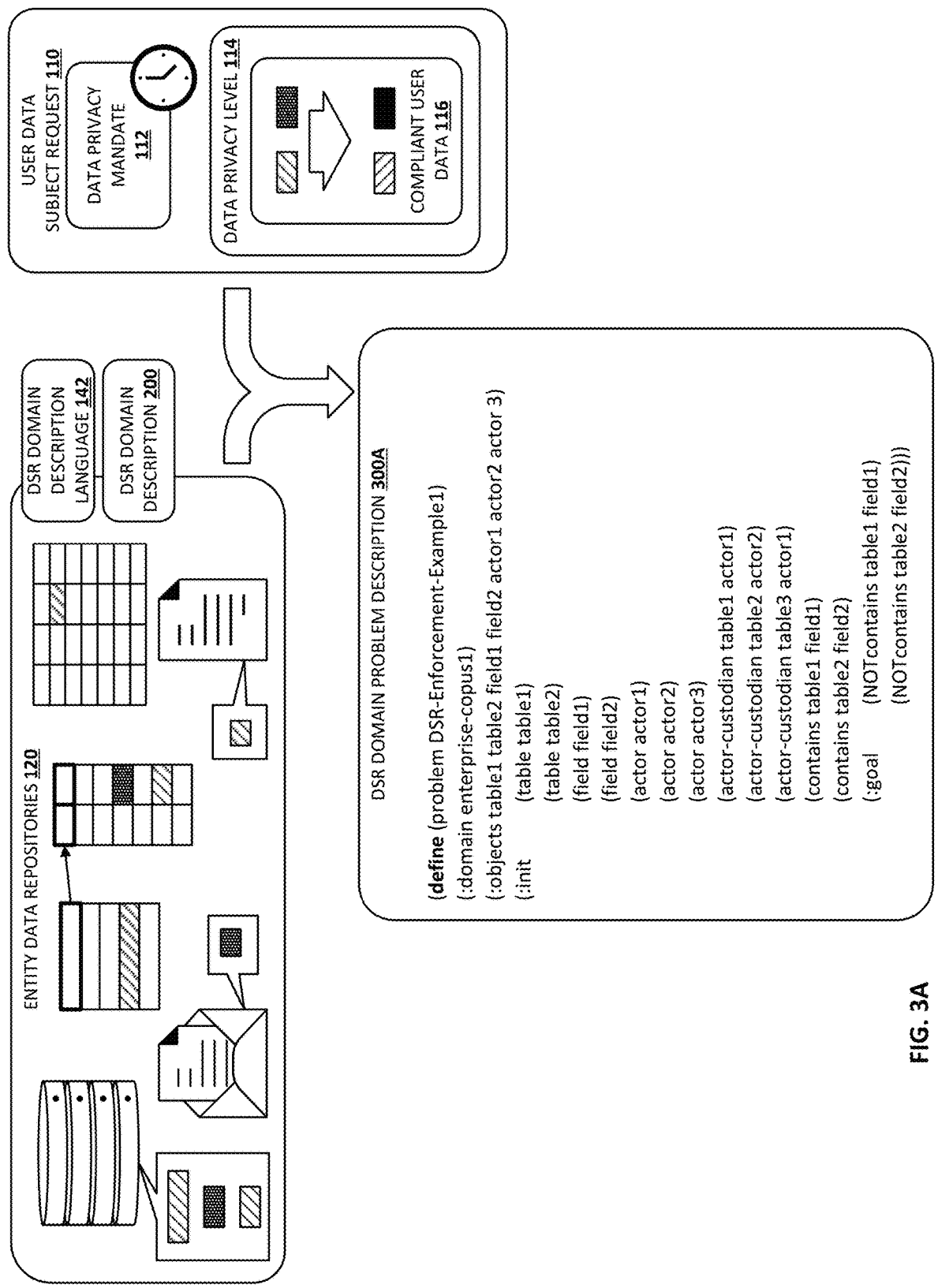
FIGS. 3A-3B depict schematic diagrams showing examples of DSR domain problem description generated based on user data subject request, in accordance with one or more embodiments.
Figure 3B:
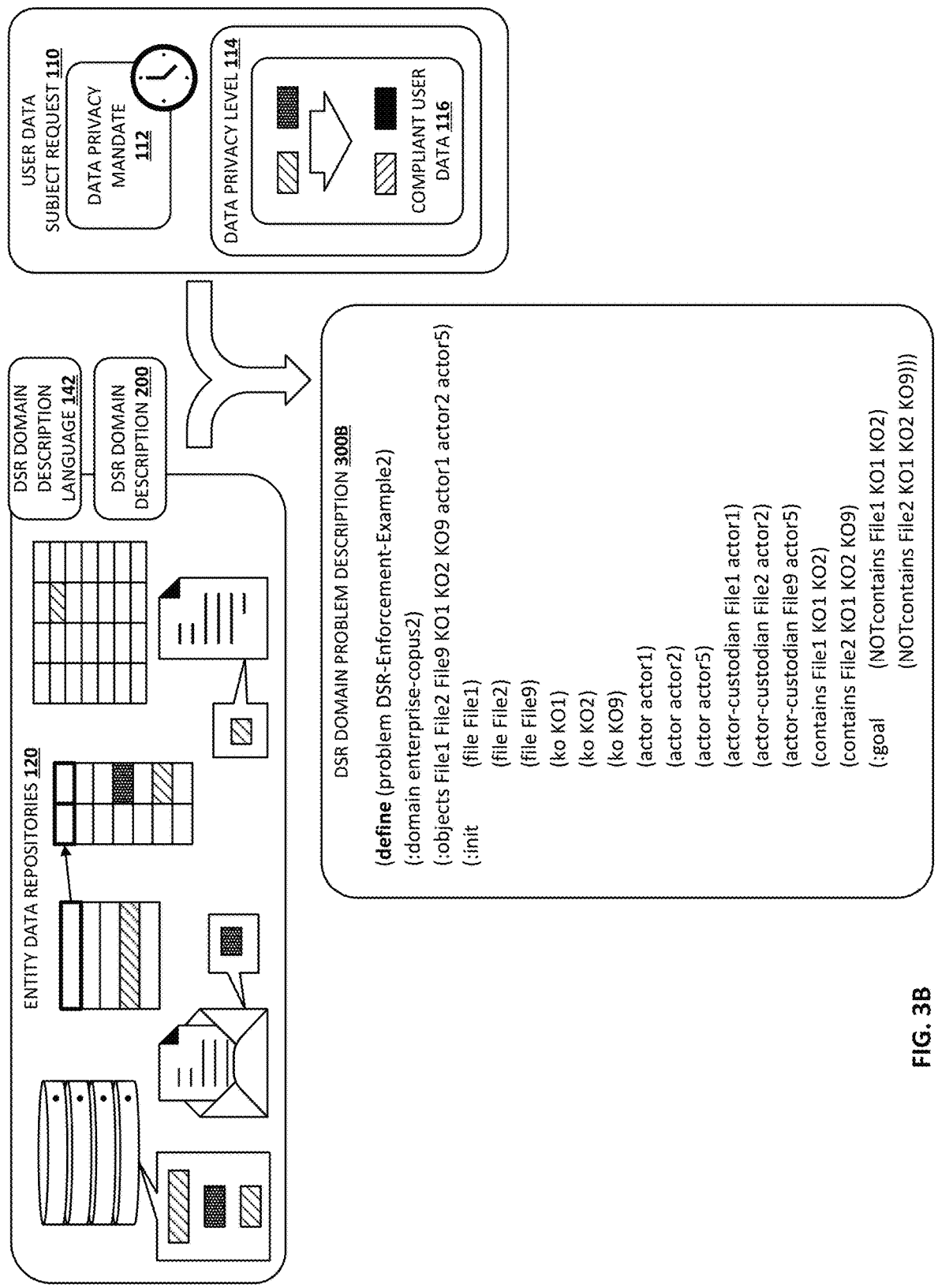

FIGS. 3A-3B depict schematic diagrams showing examples of DSR domain problem description 300A and 300B generated based on user data subject request 110. According to an embodiment of the present disclosure, a DSR request may be described using the DSR domain description language (e.g., CAPELANG) as a DSR problem description. The description of the problem (e.g., the user data to be removed, its location, and associated data-such as repository custodian information) allows for the DSR processing engine (e.g., the DSR processing engine 140 of FIG. 1) to automatically process the DSR.

Based on the DSR domain description language 142 and the DSR domain description (e.g., the DSR domain description 200 of FIG. 2) and the user DSR 110 (e.g., a given user DSR), the DSR domain problem description (of which DSR domain problem description 300A of FIG. 3A and DSR domain problem description 300B of FIG. 3B are exemplars) may be generated. The DSR domain problem description may name, initialize, instantiate, etc. various parts involved in processing the user DSR 110. The DSR domain problem description may define a problem, which may be a problem-name for a particular user DSR 110. The problem name may be an informative name, such as "userJDoeNameRemoval", an alphanumeric name such as "Request204", a time sequence name such as "011120220723" indicating a time of receipt of the user DSR 110, or any other appropriate name. The DSR domain problem description may be defined for a specific domain given by the domain-name (e.g., the domain-name 202 of FIG. 2). The DSR domain problem description may be duplicated for additional domains. The DSR domain problem description may describe the objects or elements associated with the user DSR. The objects may include files, KOs, fields, tables, rows, documents, text file, structured files, etc. The objects may be any appropriate objects or elements of the data repositories. The objects which contain data associated with a given DSR may be known based on a map of the data repositories. The objects of the DSR domain problem description may be substantially the same as the elements of the DSR domain description 200. The objects of the DSR domain problem description may be a subset of the elements of the DSR domain description 200. The objects of the DSR domain problem description may be instances of the elements of the DSR domain description 200 (e.g., table1 which is an instance of a table).

The DSR domain problem description may include an instantiation. The instantiation may include a description of the objects and a data type for the objects. For example, an object may be named table1 and a table. In another example, an object may be named File1 and be a file. The object name and type may or may not be related. Additionally, in the DSR domain problem description actors may be instantiated. The actors may be actors who are custodians of various objects. The actors may be actors for whom workflows of primitive actions may be generated. The actors may be separated from the users (e.g., the users who have user data stored in the data repositories, the user corresponding to the user DSR 110, etc.). The instantiation may include a description of the initial conditions of the objects. The initial conditions of the objects may be described in the DSR domain problem description, such as "contains" "is" "NOT", etc. For example, the DSR domain problem description may describe where user data corresponding to the user DSR 110 is location (such as by using "contains objectX itemY" or any other appropriate language). The conditions of the object may be conditions which are to be changed, such as based on the user DSR 110. The conditions of the object may be conditions which are conditional, such as "if then", "if and only if", etc. conditions. The conditions of the object may be formed as TRUE/FALSE statement. The conditions of the objects may describe an initial state (e.g., planning state) for the objects. The conditions of the objects may be determined based on a map of the data within the data repositories.

The DSR domain problem description may include a goal state. The goal state may be determined based on the user DSR 110. The goal state may be described for one or more objects, including through the use of multiple goal state descriptions. The goal states may be different from the initial states (e.g., the conditions of the objects). The goal states may be expressed as TRUE/FALSE statements. In some embodiments, the goal states may be expressed as conditional statements. For example, if an object has an initial condition "contains objectA itemB itemC", a goal may be "NOTcontains objectA itemB itemC". In another example, a goal may be "NOTcontains objectA itemB" and "NOT contains objectA itemC iff itemC is_uniqueID". A goal may correspond to a removal, a deletion, an obfuscation, an anonymization, a mark, etc. A goal may include a temporal goal, such as "MARK by TimeA".

FIG. 3A contains an example DSR domain problem description 300A, showing a problem named DSR-Enforcement-Example 1 on domain enterprise-corpus1. The DSR domain problem description 300A obtains objects table1, table2, field1, field2, actor1, actor2, and actor3. Table1 and table2 are tables, field1 and field2 are fields, while actor1, actor2, and actor3 are actors and actor-custodians for the tables (e.g., actor1 is the custodian of table1 and table3 and actor2 is the custodian of table2). Field1 is in table 1 and field2 is in table2. The DSR domain problem description 300A has a goal of removal of field1 from table1 and field2 from table2 (e.g., "NOTcontains table1 field1" and "NOTcontains table2 field2").

FIG. 3B contains an example DSR domain problem description 300B, showing a problem named DSR-Enforcement-Example 2 on domain enterprise-corpus2. The DSR domain problem description 300B obtains objects File1, File2, File9, KO1, KO2, KO9, actor1, actor2, and actor5. File1 and File2 are filed, KO1, KO2, and KO9 are knowledge objects (KOs), while actor1, actor2, and actor5 are actors and actor-custodians for the files (e.g., actor1 is the custodian of File1, actor2 is the custodian of File2, and actor5 is the custodian of File9). File1 contains KO1 and KO2. File2 contains KO1, KO2, and KO9. The DSR domain problem description 300B has a goal of removal of KO1 and KO2 from File1 and KO1, KO2, and KO9 from File2 (e.g., "NOTcontains File1 KO1 KO2" and "NOTcontains File2 KO1 KO2 KO9").

The actions of the DSR action language (e.g., DSR domain action language 144) may be used to accomplish the goals identified in the DSR domain problem description. For example, the actions of the DSR action language may be used to take an object from an initial state, as described in the DSR domain problem description, to a final state as described by the goals of the DSR domain problem description, through the use of deep Artificial Intelligence planning. Planning may involve multiple steps from an initial state to a final (e.g., "goal") state. The selection of intermediate steps (e.g., intermediate states between an initial state and a goal state) may be mediated by the use of CAPELANG, such as as a domain description language, as a problem description language, and as an action description language. The use of CAPELANG in the DSR domain may improve the selection of actions which a final state to be reached from an initial state.

The DSR action language may describe a set of actions which are used in processing of DSR. The DSR action language may include additional actions, which are not data removal actions, such as DISPLAY, NOTIFY, MARK_AS_RECEIVED, etc. The DSR action language may include actions which capture underlying semantics in DSR processing. The DSR action language may translate semantics into lower-level executable actions. The DSR action language may contain actions which are implemented by compiling, where compiling of an action may be different based on the object upon which it acts. For example, the DSR action REMOVE (ItemA TypeA) may have different associated atomic actions that the DSR action REMOVE (ItemB TypeB), such as atomic actions which depend on object type, object relationships within the object-hierarchy, etc. The DSR action language may be used to encapsulate how various actions affect states in a domain over time (e.g., from a state n to a state n+1). The use of the DSR action language may allow automated planning, automated scheduling, automated processing, etc. of a user DSR, a DSR domain problem description, etc. An algorithm may convert the DSR action language to a set of atomic actions, an ordered sequence of atomic actions, etc. The DSR action language (e.g., CAPELANG) may provide a semantic encapsulation of the atomic actions involved in processing a user DSR.

Figure 4:
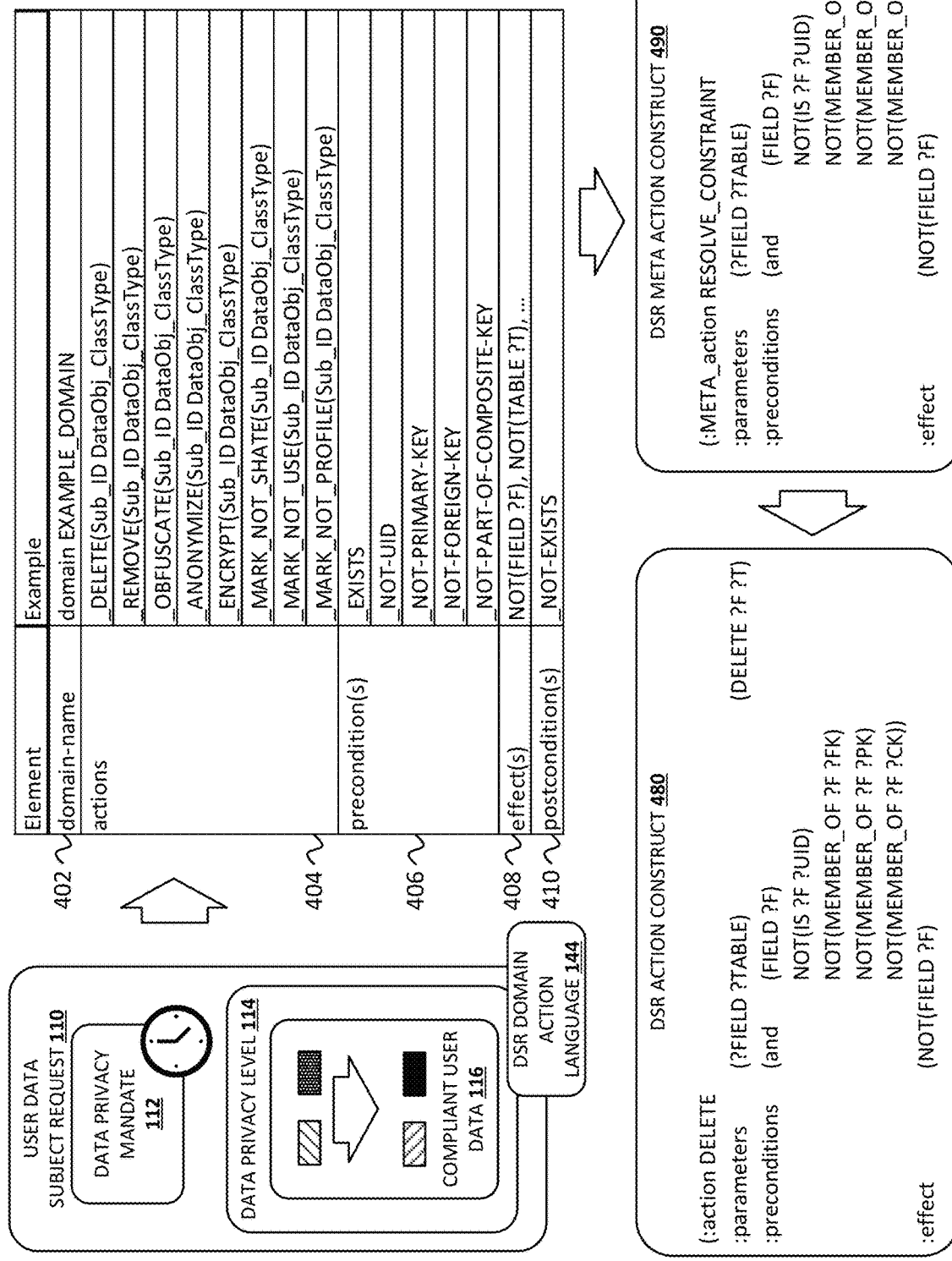
FIG. 4 depicts a schematic diagram showing an example of actions in a DSR action description language, in accordance with one or more embodiments.

FIG. 4 depicts a schematic diagram showing an example of actions in a DSR action description language. According to an embodiment of the present disclosure, an action in a DSR domain may be described in a DSR action language (e.g., CAPELANG). The action may be included in the description of the domain in the DSR domain description language (e.g., initialized in the domain description). Based on a DSR domain problem description, one or more action may be selected (such as by a planning algorithm). A selected action may include an encapsulation of the atomic actions necessary to perform the action, and may be used to generate a sequence of atomic actions which may be assigned to actors, such as based on data repository custodial permissions.

An action may be described by a DSR action construct. A DSR action construct may have the following elements: a domain-name 402, one or more action 404, precondition(s) 406, effect(s) 408, and postcondition(s) 410. The domain-name 402 may be the name of the domain, as previously described, or any other appropriate domain identifier that identifies which domain the action operates in. In some embodiments, such as a closed system, the domain-name 402 may be assumed and not explicitly stated. The one or more actions 404 may be DSR specific actions. Herein, "DSR specific" means actions that allow for DSR processing. This does not apply that the DSR specific actions may not be applied in other technology domains, such as in data grooming, data cleansing, etc. Likewise, this does not preclude the existence of other actions which may or may not be DSR specific, such as querying, updating, returning values, etc. The one or more actions 404 may include DELETE, REMOVE, OBFUSCATE, ANONYMIZE, ENCRYPT, MARK_NOT_SHARE, MARK_NOT_USE, MARK_NOT_PROFILE, etc. The precondition(s) 406 may include conditional requirements on objects that the action is to operate upon. For example, the precondition(s) 406 may be applied to an object, such as as TRUE/FALSE statements, in order to determine if the action can be applied to the object, if the action causes a change in the object if applied, etc. For example, DELETE (ItemA TypeA) may be prohibited if ItemA is a private key. In another example, DELETE (FieldA field) may cause no change in Table1 if Table1 does not contain FieldA. Effect(s) 408 may describe the state of the object after the action is applied. Effect(s) 408 may be goals (e.g., of the DSR domain problem description). In some embodiments, effect(s) 408 may be intermediate states (e.g., between the initial conditions and the goal state) which may advance the processing of the user DSR. Postcondition(s) 410 may be changes to the objects which may cause updating of the DSR domain description, the object-type hierarchy, etc. In some embodiments, postcondition(s) 410 may be a subset of effect(s) 408.

FIG. 4 depicts an example DSR action construct 480, which describes an action for DELETE. In the example DSR action construct 480, DELETE may operate on a field of a table. DELETE may operate if the field exists, if the field is not a unique ID (e.g., UID), is not a member of a foreign key, is not a member of a private key, and is not a member of a composite key. In the example DSR action construct 480, the result of DELETE, subject to the preconditions, may be that the field no longer exists.

DSR action constructs may be combined into meta actions. DSR meta action constructs may be broken down into lower level DSR action constructs. Meta actions may be multiple actions which occur together and which may be optimized into a set of atomic actions, where the atomic actions of the multiple DSR action constructs may be co-mingled in an action sequence. Meta actions may evolve, based on algorithms, programmer decisions, etc. from actions which occur together (e.g., in series, in parallel, sequentially, etc.) FIG. 4 depicts an example DSR meta action construct 490, which describes an action for RESOLVE_CONSTRAINT. In the example DSR meta action construct 490, RESOLVE_CONSTRAINT may operate on a field of a table. RESOLVE_CONSTRAINT may operate if the field exists, if the field is not a unique ID (e.g., UID), is not a member of a foreign key, is not a member of a private key, and is not a member of a composite key. In the example DSR action construct 480, the result of RESOLVE_CONSTRAINT, subject to the preconditions, may be that the field no longer exists. RESOLVE_CONSTRAINT may, for example, function to determine if a field is able to be deleted (e.g., that a given field has no meta constrains—is not a unique ID, is not a member of a foreign key, is not a member of a private key, is not a member of a composite key, etc.). In the illustrated example, if the preconditions (which may correspond to constraint detection) of the DSR meta action are satisfied, the DSR meta action may be identical to the DSR action construct 480.

Figure 5A:
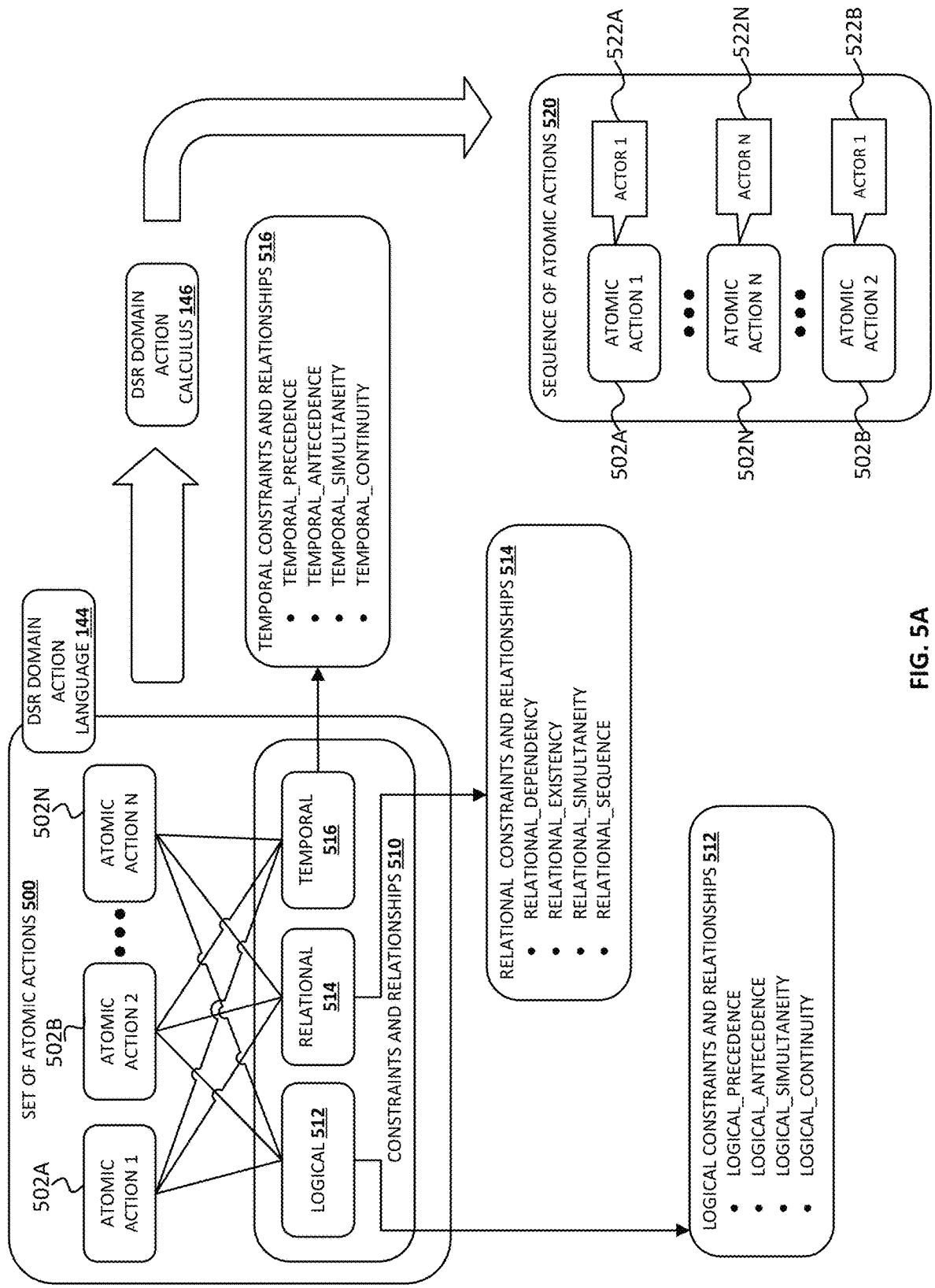
FIG. 5A depicts a schematic diagram showing example constraints resolved by a DSR domain action calculus, in accordance with one or more embodiments.

FIG. 5A depicts a schematic diagram showing example constraints resolved by a DSR domain action calculus 146. According to an embodiment of the present disclosure, a DSR action construct may correspond to one or more atomic action which may be ordered based on a DSR domain action calculus operating on constraints and relationships between objects, atomic actions, etc. A DSR action construct, such as described by a DSR domain action language 144, may correspond to a set of atomic actions 500. Herein, "atomic actions" may be the smallest logical subset of database actions. For example, an action corresponding to obfuscation (e.g., OBFUSCATE) of a field may consist of following atomic actions (1) obtain value of field to be obfuscated (2) generate obfuscated field value based on obtained field value and obfuscation protocol (3) delete field value from location (4) add obfuscated field value to location from which previous field value is deleted. The set of atomic actions 500 may not have a sequential order. The set of atomic actions 500 may include N atomic actions (e.g., atomic action 1 502A, atomic action 2 502B, . . . atomic action N 502N). The atomic actions themselves may have constraints and relationships 510 or be subject to constraints and relationships 510 of the objects upon which they act. The constraints and relationships 510 may include logical constraints and relationships 512, relational constraints and relationships 514, and temporal constraints and relationships 516. The DSR processing engine may operate to generate a sequence of atomic actions 520, which may be an ordered sequence of the set of atomic actions 500, based on the DSR domain action calculus 146 operating on the constraints and relationships 510. Each of the sequence of atomic actions 520 may be assigned to (e.g., associated with) an actor (e.g., actors 522A-522N).

The logical constraints and relationships 512 may include logical precedence, logical antecedence, logical simultaneity, logical continuity, etc. The relational constraints and relationships 514 may include relational dependency, relational existency, relational simultaneity, relational sequence, etc. The temporal constraints and relationships 516 may include temporal precedence, temporal antecedence, temporal simultaneity, temporal continuity, etc. The temporal constraints and relationships 516 may be a subset of the logical constraints and relationships 512. The temporal constraints and relationships 516 may be different from the logical constraints and relationships 512 in that they may have a time (e.g., start time, finish time, etc.) component.

FIGS. 5B-5C depict example constraints for various DSR actions, in accordance with one or more embodiment. FIG. 5B depicts a table 530 showing various actions which operate on specific types of objects (e.g., actions for a given object class). The table 530 shows actions DELETE, REMOVE, OBFUSCATE, and ANONYMIZE, but any appropriate action may likewise operate under constraints. The table 530 shows actions operating on objects field (e.g., Field_Value), row (e.g., Row), table (e.g., Table), but such action may operate on any appropriate object. The table 530 shows that each action describes a specific action, an object class, and a specific object of that class. For each action, a set of constraints is identified. The set of constraints is obtained from the object (e.g., the instance of the object) upon which the action operates. For example, for the action Delete_Field_Value, which operates on a field "FieldName" in a "TableName", the set of constraints is obtained from the identity of the field (e.g., as constraint of FieldName, with the set of constraints called "F_ConstraintSETName" in the illustrated example). The set of constraints may include logical, relational, and temporal constraints. The constraints may be constraints and dependencies between objects of the same type. To continue the example above, the constraints of the F_ConstraintSETName are constraints between data elements (e.g., field values).

FIG. 5C depicts a table 540 showing various actions which operate on knowledge objects (KOs). The table 540 shows actions DELETE, REMOVE, OBFUSCATE, and ANONYMIZE, but any appropriate action may likewise operate under constraints. The table 540 shows actions operating on knowledge objects, but the actions may operate on any appropriate object. KOs may be different from table data (e.g., field, row, table, schema) in that they may have a different object-type hierarchy (e.g., may not contain primary key, composite key, foreign key, star schema, etc. type relationships). KOs may still contain relationships, such as between KOs and various files or file systems. The table 540 shows that each action describes a KO of a KO type, with a KO value and a location (e.g., "FileName"). For each action, a set of constraints is identified. The set of constraints may be a full set of constraints (depicted for actions Remove, Obfuscate, and Anonymize), containing logical, relational and temporal constraints, or a partial set of constraints (depicted for action Delete). If the set of constraints is divided into subsets, the subsets may correspond to logical, relational, and temporal constraints. The set of constraints may be obtained from the location of the KO (e.g, the "FileName" (e.g., the instance of the object) upon which the action operates. For example, for the action Delete_KO_Type, which operates on a KO "KO_Value" in "FileName", the set of constraints is obtained from the identity of the location (e.g., as constraint of FileName, with the set of constraints called "KO_ConstraintSETName" in the illustrated example). The constraints may be constraints and dependencies between objects of the same type (e.g., KO_Type), objects in the same location (e.g., FileName), etc.

Figure 6:
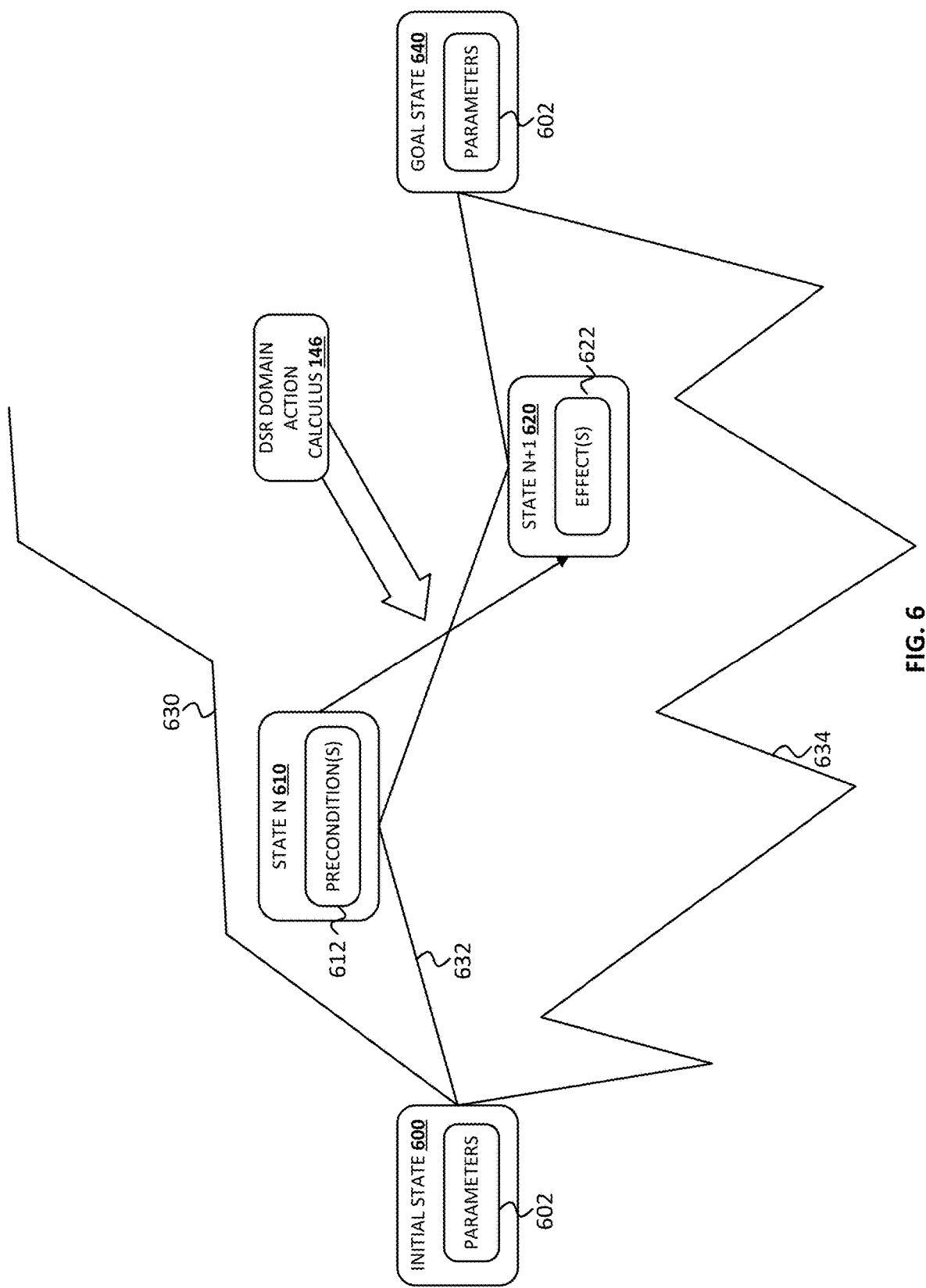
FIG. 6 depicts an example application of a DSR action calculus to object states for DSR processing, in accordance with one or more embodiment.

FIG. 6 depicts an example application of a DSR domain action calculus 146 to object states for DSR processing. According to an embodiment of the present disclosure, a DSR action calculus incorporates the DSR domain description, the DSR domain problem description, and the DSR action construct to determine a sequence of atomic actions. The sequence of atomic actions may correspond to a plan between an initial state 600 and a goal state 640. The initial state 600 may be the state of the domain before (or at the time of) receipt of the user DSR. The goal state 640 may be the domain in compliance with the user DSR. The goal state 640 may be determined by a date privacy mandate under which the user DSR has been submitted. The goal state 640 may be described in the DSR domain problem description (e.g., the DSR domain problem description 300A or 300B). The domain may have parameters 602 (e.g., objects) which may be constant between the initial state 600 and the goal state 640. In some embodiments, the parameters may change between the initial state 600 and the goal state 640, such as when a table or other object (e.g., KO) is deleted from the domain.

The distance between the initial state 600 and the goal state 640 may be spanned by one or more intermediate states (e.g., state N 610 and state N+1 620). The purpose of planning may be to generate a path between the initial state 600 and the goal state 640 which occupies the fewest intermediate steps, the shortest path, the least steep path (e.g., which experiences the most gradual transition between states), etc. Planning may operate to reduce an objective function value for a path or to select a path with a reduced (or otherwise optimized) objective function value. In some embodiments, the objective function may be a measure of compliance with data privacy mandates. In some embodiments, the objective functions may be a measure of preservation of data relationships (e.g., the ability of business application to run on the DSR compliant entity data repositories). In some embodiments, the objective function may be a measure of impact of atomic actions on data repositories, such as a number of atomic actions, a likelihood of business application failure cause by atomic actions, etc. Planning algorithms may generate multiple paths (e.g., paths 630, 632, and 634). Some generated paths may not reach the goal state 640 (e.g., path 630). Some paths may be longer than others (e.g., include more intermediate states such as path 634 when compared to path 632). The DSR domain action calculus 146 may operate, together with DSR action constructs, to optimize a path between the initial state 600 and the goal state 640 and to optimize transitions between each intermediate state, based on any appropriate objective function. The transition between a first state (e.g., state N 610) and a subsequent state (e.g., state N+1 620) may be the result of a DSR action (or atomic action). State N 610 may be described by precondition(s) 612, while state N+1 620 may be described by effect(s) 622 of whichever action (or atomic action) causes the transition between the states. For an additional state (e.g., a state N+2), the effect(s) 622 of state N+1 620 may become the preconditions upon which an action acts. For a previous state (e.g., a state N−1), the preconditions 612 of state N 610 may be the effects of the action on the previous state. In this way, a sequence of actions (or atomic actions) may be generated, based on the DSR domain action calculus, which optimizes a path between the initial state 600 and the goal state 640.

The DSR domain action calculus may operate upon constraints between objects, object types, actions, etc. Example temporal constraints are described herein, but logical and relational constraints may likewise exist and influence the DSR domain action calculus. Example temporal constraints may include: start concurrently, end concurrently, start and end concurrently (e.g., simultaneity), start concurrently and end non-concurrently (e.g., partial start simultaneity), start non-concurrently and end concurrently (e.g., partial end simultaneity), start after and end before (e.g., total overlapping short), start after and end after (e.g., partial overlapping late), start before and end before (e.g., partial overlapping early), start before and end after (e.g., total overlapping long), etc. Each temporal constraint may operate on multiple actions—that is, each temporal constraint may govern a relationship between a first action and a second action. The temporal relationships may have inverses and other relationships between them. For example, if action 1 starts after and ends before action 2 (e.g., total overlapping short), then action 2 starts before and ends after action 1 (e.g., total overlapping long). In another example, if action 1 starts after and ends after action 2 (e.g., partial overlapping late), then action 2 starts before and ends before action 1 (e.g., partial overlapping early). The relationships between actions and temporal constraints allows each temporal constraint on multiple actions to be translated based on the action to which it is currently being applied. Likewise, logical and relational constrains may be described in relation to multiple actions and the full set of constraints may be described for each action using the constraints and their inverses.

The DSR action calculus may be used to determine a path between the original state and the goal sate based on planning algorithms (e.g., planning algorithms 148). The planning algorithms may operate based on a forward chaining state space search. The planning algorithms may operate backwards based on constraints (e.g., dependencies) and temporal (and logical and relational) heuristics. The planning algorithms may operate by a combination of both forward chaining state space search and backward based on constraints and heuristics. The planning algorithms may be precedence constraint resolution (PCR) heuristic based tree search algorithms. The planning algorithms may be or include a Monte Carlo Tree Search (MCTS).

The DSR domain may be described by a "world model" or model of the domain. The DSR domain model may be quasi-deterministic. The DSR domain model may be substantially static—that is, mostly static. However, the DSR domain model may change relatively frequently, including based on updates to objects and data stored therein, updates to object-type hierarchy, updates to object hierarchy, etc.

Figure 7:
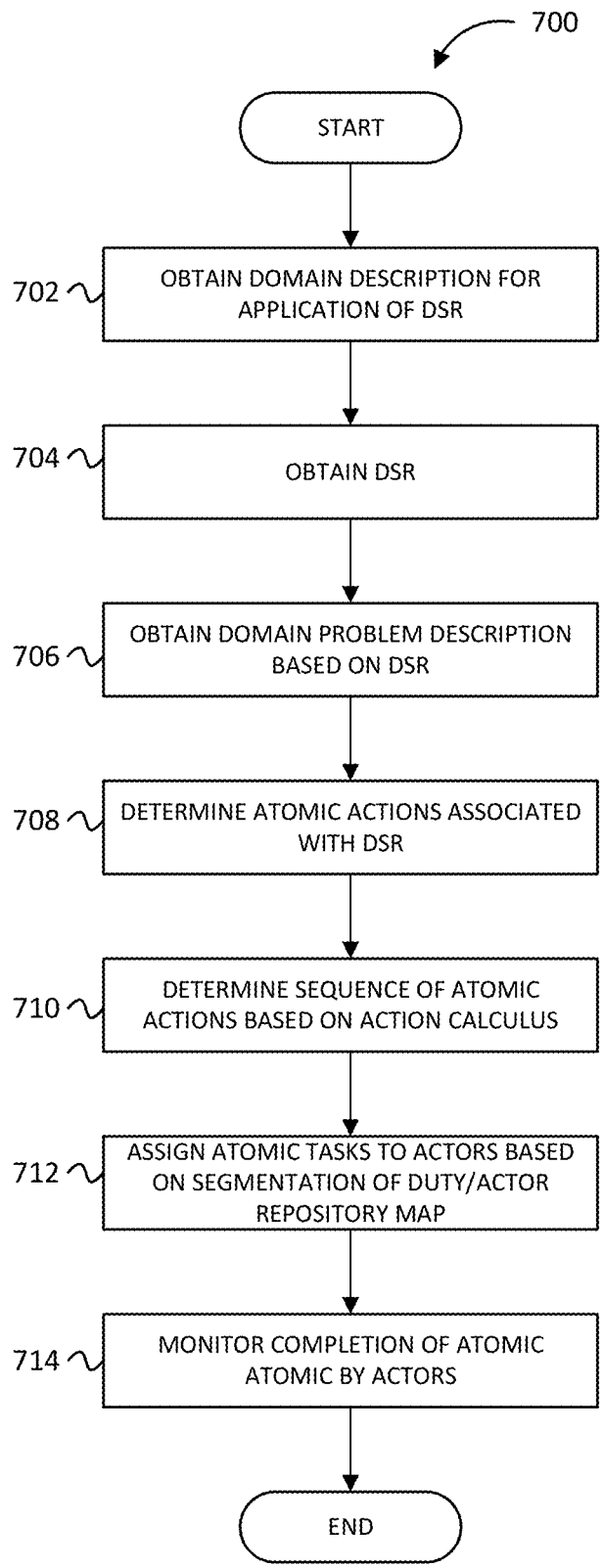
FIG. 7 is a flowchart illustrating an example method for DSR processing, in accordance with one or more embodiments.

FIG. 7 is a flowchart illustrating an example method 700 for DSR processing. According to an embodiment of the present disclosure, a DSR request may be automatically processed based on a DSR domain description and a received user DSR. Each of these operations is described in detail below. The operations of method 700 presented below are intended to be illustrative. In some embodiments, method 700 may be accomplished with one or more additional operations not described, and/or without one or more of the operations discussed. Additionally, the order in which the operations of method 700 are illustrated in FIG. 7 and described below is not intended to be limiting. In some embodiments, one or more portions of method 700 may be implemented (e.g., by simulation, modeling, etc.) in one or more processing devices (e.g., one or more processors). The one or more processing devices may include one or more devices executing some or all of the operations of method 700 in response to instructions stored electronically on an electronic storage medium. The one or more processing devices may include one or more devices configured through hardware, firmware, and/or software to be specifically designed for execution of one or more of the operations of method 700, for example.

At an operation 702, a DSR domain description in obtained for an application of DSR processing. The domain description may be defined in CAPELANG. The domain description may be described using a DSR domain description language, such as previously described. The domain description may be obtained from a DSR processing server. The domain description may be generated based on the domain. The domain description may be obtained from storage (e.g., memory). The domain description may be update based on a determined change in the domain.

At an operation 704, a DSR is received. The DSR may be received based on user input. The DSR may indicate a request for identification of user data in an entity's data repositories. The DSR may indicate a request for user data removal. The DSR request may indicate a level of user data removal (e.g., deletion, obfuscation, anonymization, etc.). The DSR request may indicate a data privacy mandate for which the DSR is requesting compliance. The DSR request may be associated with a time deadline, such as for processing, for verifying, etc. The DSR may be any appropriate DSR, such as previously described.

At an operation 706, a DSR domain problem description is obtained based on the DSR. The domain problem description may be generated, such as based on the DSR and the domain description. The domain problem description may be generated based on a domain model (e.g., a world model). The domain problem description may be obtained from a library or other storage, such as based on a set of common domain problem descriptions, templates of domain problem descriptions, etc.

At an operation 708, a set of atomic actions associated with the DSR is determined. The atomic actions may be determined based on the domain problem description, including from one or more action described in the domain problem description. The set of atomic actions may be unordered, preliminarily ordered, etc. The set of atomic actions may be any appropriate atomic actions, including those previously described.

At an operation 710, a sequence of atomic actions is determined based on a DSR action calculus. The action calculus may be any appropriate calculus that relates logical, relational, and temporal constraints between atomic actions of the set of atomic actions. The sequence of atomic actions may be an ordered set of the atomic actions. The sequence of atomic actions may be divided into sub-sequences of atomic actions, such as sequences for each data repository, each actor, etc. The sequence of atomic actions may be determined using planning algorithms as previously described. The sequence of atomic actions may be determined using any appropriate method, such as those previously described.

At an operation 712, the atomic actions of the sequence of atomic actions are assigned to actors (e.g., custodians of the various elements) based on a segmentation of duty or actor repository map. The actors may be human (e.g., IT technologist), may be software based, etc. The actors may receive workflow or other ordered action items.

At an operation 714, the completion of the atomic tasks by the actors is monitored. The completion may be monitored based on monitoring the contents of the data repositories in which the data resides. The completion may be monitored based on actor-reported data. The completion may be monitored and results displayed in a dashboard, daily update, weekly update, etc. The completion may be monitored for time duration (e.g., time DSR took to completion), for completion, for impact on other elements of the data repository, etc.

As described above, method 700 (and/or the other methods described here) is configured for DSR processing.

Figure 8:
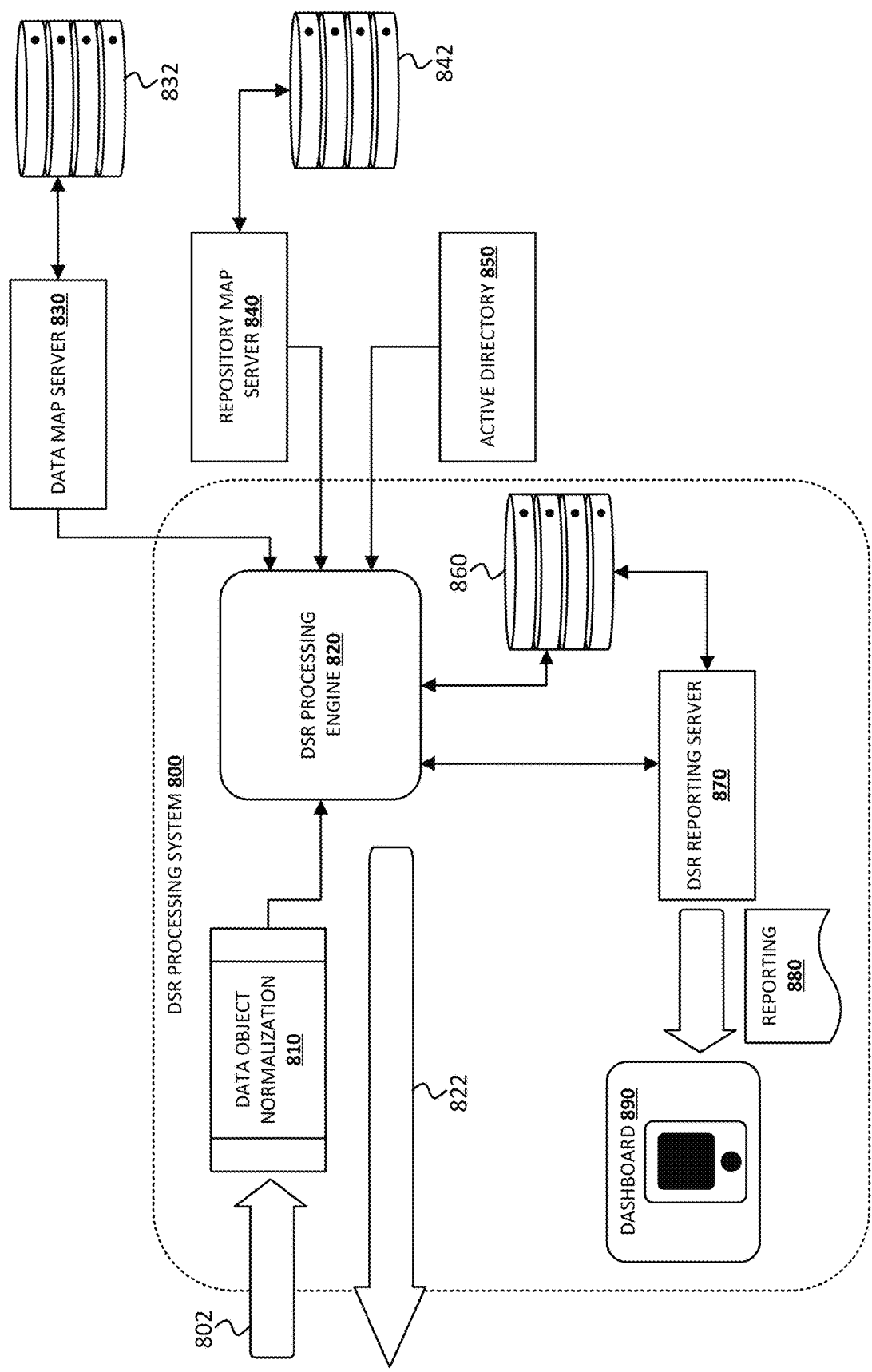
FIG. 8 is a representational diagram of a system for DSR processing, in accordance with one or more embodiments.

FIG. 8 is a representational diagram of a system 800 for DSR processing. According to an embodiment of the present disclosure, a system for data privacy compliance processing is provided which may operate on DSR and output information about the completion of the DSR. The system may be an automated server, which may be in communication with one or more data repository of the domain. The system 800 may receive an incoming DSR 802. The incoming DSR 802 may undergo a data normalization process, such as data object normalization 810. Data normalization may involve standardization of a DSR for processing by the system 800. Data normalization may involve data grooming. Data normalization may result in a DSR request format that identifies the user, user data, and action for the DSR. Data normalization may produce a DSR domain problem description, which may describe those items of the domain on which the DSR acts and may list actions or goals the DSR wishes to have accomplished. Data object normalization 810 may be any appropriate data normalization.

The DSR may then pass to the DSR processing engine 820, which may be any appropriate DSR processing engine as described herein (such as the DSR processing engine 140 of FIG. 1). The DSR processing engine 820 may receive information from a data map server 830. The data map server 830 may retrieve locations for data of the DSR based on a map of the entity's data repositories. The data map server 830 may maintain a map of the various objects in the domain and the types of data stored therein. The data map server 830 may be in communication with one or more data repositories 832, which may or may not be the entity's data repositories. The data repositories 832 may contain a data map. The data repositories 832 and the data map server 830 may be updated based on updates to the data of the entity's data repositories.

The DSR processing engine 820 may receive information from a repository map server 840. The repository map server 840 may retrieve actor permissions for the objects of the DSR based on a map of permissions for the entity's data repositories. The repository map server 840 may maintain a map of various objects in the domain and actor-custodian permissions for the objects. The repository map server 840 may be in communication with one or more data repositories 842, which may or may not be the entity's data repositories. The data repositories 842 may contain a permission map. The data repository 842 and the repository map server may be updated based on on updates to the data of the entity's data repositories.

The DSR processing engine 820 may receive information from an active directory 850, which may be any appropriate active directory. The active directory 850 may be any appropriate directory service, which may maintain a list of user permissions, user information, etc.

The DSR processing engine 820 may, based on the data map server 830, repository map server 840, and active directory 850, determine where user data from a DSR request is location and who has the ability to process the DSR request based on those locations.

The DSR processing engine 820 may contain a DSR workflow engine, which may generate one or more workflow for one or more actor of the repository map server 840. The DSR processing engine 820 may operate on an entity's data repositories 860 (which may or may not include data repositories 832 and data repositories 842 based on whether or not they contain user data). The DSR processing engine 820 may dispatch tasks, including in workflows. The DSR processing engine 820 may perform remediation if one or more atomic action or workflow item does not complete. The DSR processing engine 820 may perform escalation, such as contacting a supervisor, controller, etc. if the workflow items are not completing as expected. In some embodiments, the DSR processing engine 820 may send an outgoing DSR response 822. The outgoing DSR response 822 in response to receipt of the incoming DSR 802, in response to completion of the workflows associated with the incoming DSR 802, or at any other appropriate point in the processing cycle.

A DSR reporting server 870 may monitor the status of the workflows or of the entity data repositories 860 in order to monitor compliance with the incoming DSR 802. The DSR reporting server 870 may generate reports 880 containing DSR service status, privacy mandate reporting data, realtime statistics, completion rates, etc. The reports 880 may be shared with users of the DSR processing engine 820 in any appropriate manner, including by display on a dashboard 890.

Figure 9:
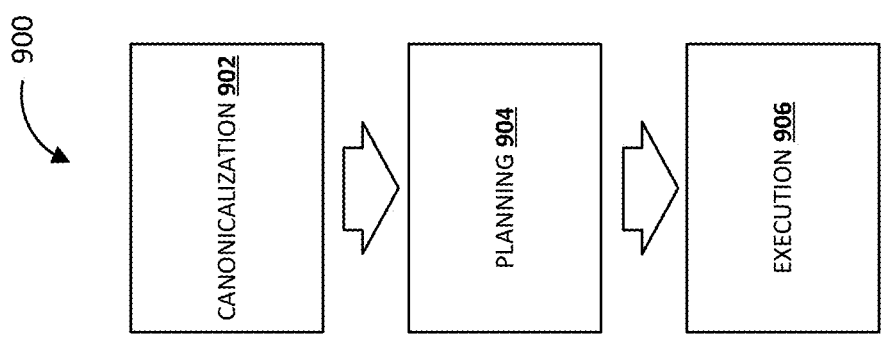
FIG. 9 is a flowchart illustrating an example method for DSR processing server operation, in accordance with one or more embodiments.

FIG. 9 is a flowchart illustrating an example method 900 for DSR processing system operation. According to an embodiment of the precent disclosure, DSR request may be processed based on canonicalization, planning, and execution of said planning. The operations of method 900 presented below are intended to be illustrative. In some embodiments, method 900 may be accomplished with one or more additional operations not described, and/or without one or more of the operations discussed. Additionally, the order in which the operations of method 900 are illustrated in FIG. 9 and described below is not intended to be limiting. In some embodiments, one or more portions of method 900 may be implemented (e.g., by simulation, modeling, etc.) in one or more processing devices (e.g., one or more processors). The one or more processing devices may include one or more devices executing some or all of the operations of method 900 in response to instructions stored electronically on an electronic storage medium. The one or more processing devices may include one or more devices configured through hardware, firmware, and/or software to be specifically designed for execution of one or more of the operations of method 900, for example.

At an operation 902, canonicalization may occur. Canonicalization may be normalization. A DSR request may be canonicalized when received by the DSR processing system. The domain may be canonicalized, such as by generation of a DSR domain description. In some embodiments, canonicalization may be performed on substantially all input received by a DSR processing system. Canonicalization may identify which objects are involved with a given DSR. Canonicalization may determine which actions are involved with a given DSR request. Canonicalization may identify which canonical data items (e.g., objects, sub-elements in objects, etc.) correspond to the DSR.

At an operation 904, a plan is generated. The plan may have two components, a meta plan (based on a meta schema of data repositories) and an execution plan (or implementation plan). The meta plan may identify in which repositories the object to be actioned are located. The meta plan may determine which repositories are involved based on the objects (e.g., canonical data items) identified in canonicalization. The metal plan may involve resolving logical, relational, and temporal constraints between data elements in the canonical data items.

The execution plan may construct an action sequence based on logical and relational constraints. The execution plan may construct an action schedule based on temporal constraints. The execution plan may include a determination of which actions are assigned to which actors, such as based on a data repository map. The execution plan may be constructed based on the meta plan.

At an operation 906, a service plan is executed. The execution may involve dispatching of actions (e.g., a workflow, a sequence of actions, a schedule of actions, etc.) to actors. The execution may involve monitoring of the actor's execution of the actions, the execution of the actions, the result of the execution on the data repositories, etc. The execution may involve reworking or evolving the sequence of actions based on an error in the execution. That is, the execution may involve a determination that re-planning may occur, such as based on a failure trigger for one or more atomic action.

As described above, method 900 (and/or the other methods described here) is configured for DSR processing system operation.

Figure 10A:
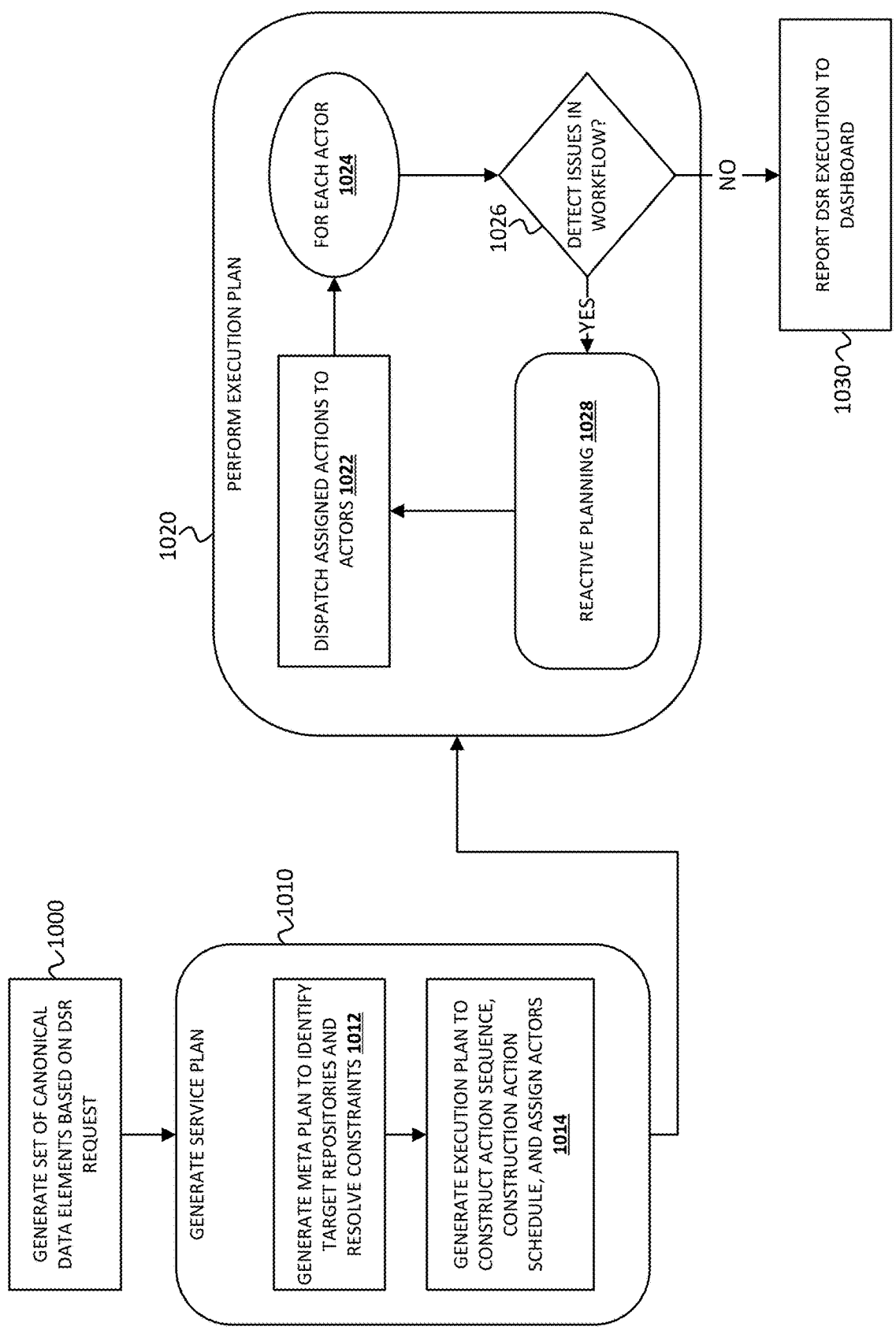
FIGS. 10A-10D depict schematic diagrams for DSR processing, in accordance with one or more embodiment.
Figure 10B:
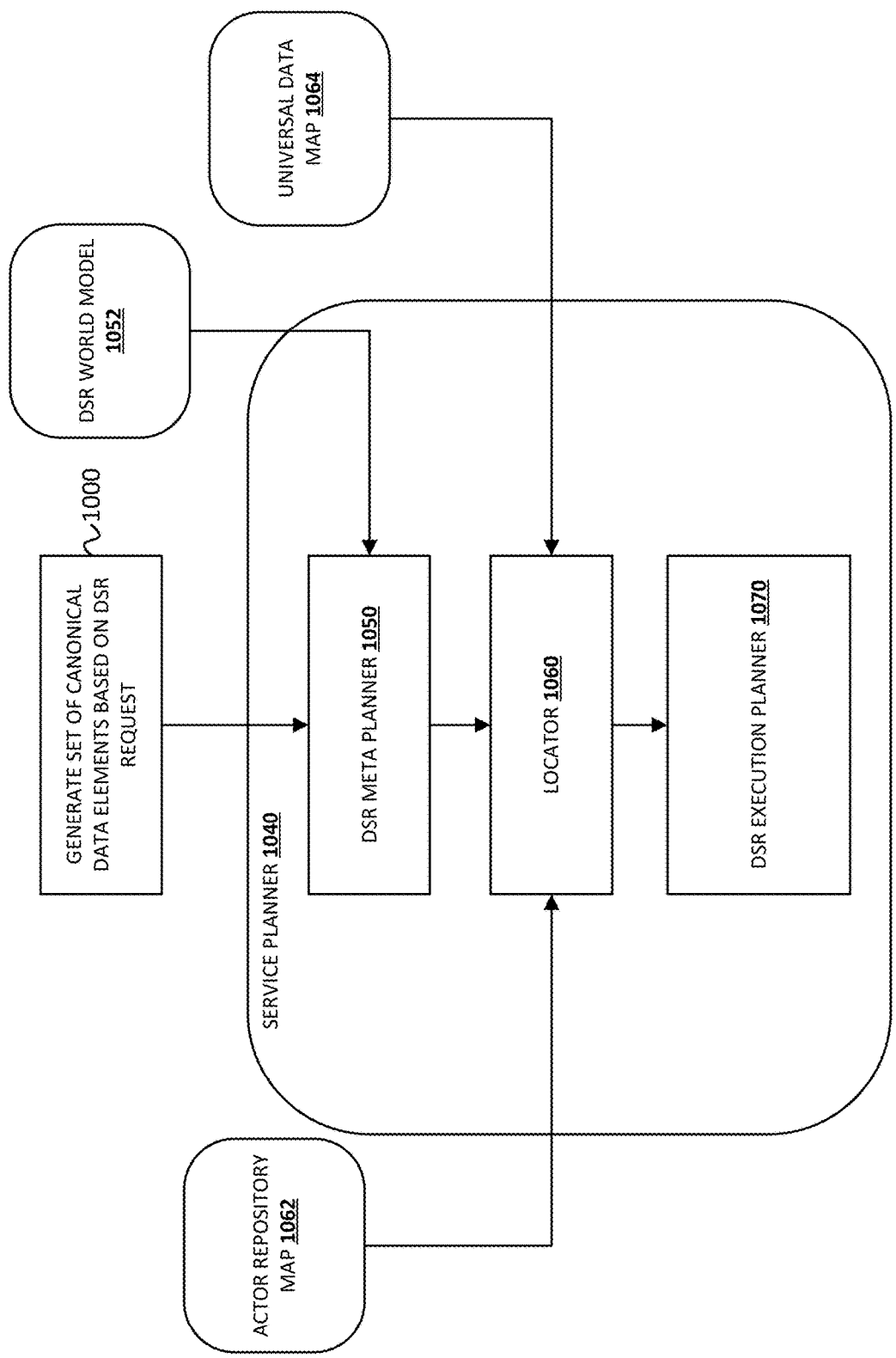
Figure 10C:
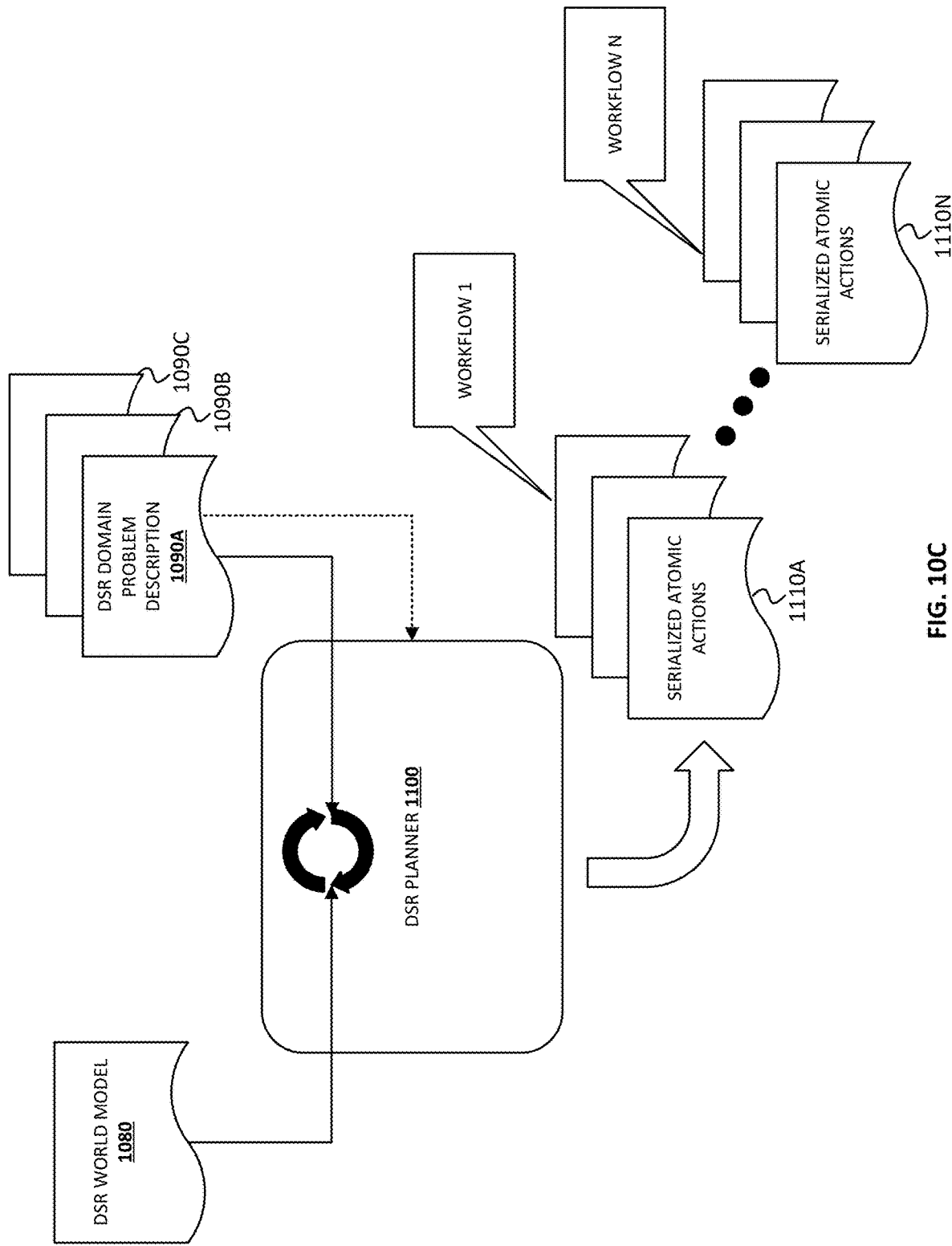

FIGS. 10A-10C depict schematic diagrams for DSR processing. FIG. 10A depicts a schematic diagram for DSR processing. According to an embodiment of the present disclosure, a DSR may be automatically processed, dispatched as a set of tasks to actors, and monitored through completion. At an operation 1000, a set of canonical elements are generated based on the DSR request, such as by methods previously explained in relation to the operation 902 of FIG. 9.

At an operation 1010, a service plan is generated. The generation of the service plan may include generation of a meta plan to identify target repositories and resolve constraints (at an operation 1012). The meta plan may be generated by any appropriate method, such as those described in relation to FIG. 9. The generation of the service plan may include generation of an execution plan to construct action sequence, construct action schedule, and assign actors (at an operation 1014). The execution plan may be generated by any appropriate method, such as those described in relation to FIG. 9.

At an operation 1020, the execution plan may be performed. The execution plan may be performed on the entity's data repositories. The execution plan may include dispatching of assigned actions to actors (at an operation 1022). The execution plan may include monitoring of the actions assigned to each actor (at an operation 1024). The execution plan may include detection of an issues in the actor's workflow (at an operation 1026). If an issue is detected in the actor's workflow, flow may continue to an operation 1028 where reactive planning is performed. Reactive planning 1028 may be replanning, root cause failure analysis, etc. Reactive planning 1028 may trigger re-evaluation of a repository map, a data map, a meta schema, a world model, etc. Reactive planning 1028 may prompt generation of a new service plan, such as at the operation 1010. Reactive planning 1028 may deliver updated workflows to actors, such as by performing the operation 1010 and dispatching subsequent assigned actions to actors. The dispatching may include a warning to discard previous workflow items, such as if the workflow has changed due to the reactive planning 1028. Triggering of reactive planning 1028 may also trigger a warning, including on a dashboard, to a user (such as an actor) that reactive planning 1028 is occurring.

If an issue is not detected in the actor's workflow, flow may continue to an operation 1030 where DSR execution is reported. The DSR execution may be reported to a dashboard. In some embodiments, successful DSR execution may also be reported to the user who submitted the DSR.

FIG. 10B depicts a system for DSR processing. According to an embodiment of the present disclosure, a system operating by methods, such as those previously described, may operate to process DSR. At an operation 1000, a set of canonical elements are generated based on the DSR request, such as by methods previously explained in relation to the operation 902 of FIG. 9. The set (or list) of canonical elements may be fed into a service planner 1040 (e.g., a DSR service planner).

At the service planner 1040, a DSR meta planner 1050 may operate on the list of canonical elements. The DSR meta planner may also operate on a DSR world model 1052 (which may be described by or output a DSR domain description). The DSR meta planner 1050 may identify local, relational, and temporal constraints between canonical elements, actions, etc. The DSR meta planner 1050 may resolve the local, relational, and temporal constraints by determining a sequence of atomic actions with a lowest objective function or other minimization of destruction of canonical elements. The DSR meta planner 1050 may operate by any appropriate method described herein.

Based on the sequence of atomic actions, a locator 1060 may determine locations for the canonical elements, such as based on a universal data map 1064. The universal data map 1064 may include a list of repositories containing given canonical data. The locator 1060 may also determine an actor responsible for each of the canonical elements or atomic actions, based on the location of the canonical elements and a list of custodian actors for the repositories containing the canonical elements—e.g., an actor repository map 1062.

Based on the sequence of atomic actions and the output of the locator 1060, a DSR execution planner 1070 may construct a sequence of actions. Based on the sequence of atomic actions and temporal constraints, the DSR execution planner may construct a schedule of actions. Based on the actor repository map 1062, the DSR execution planner 1070 may dispatch one or more action to an actor, the actor being responsible for the data repository in which the atomic action takes place. The actions may be dispatched as workflows, sequences, etc. The DSR execution planner 1070 may operate by any appropriate method described herein.

FIG. 10C depicts a schematic diagram for a DSR planner 1100. The DSR planner 1100 operates on a DSR world model 1080, which may be described using CAPELANG. The DSR world model 1080 may be a DSR domain description. The DSR world model 1080 may include a universal data map. The DSR world model 1080 may operate on an entity's data repositories. The DSR world model 1080 may be updated as a function of operation of the DSR planner 1100.

The DSR planner operates on DSR domain problem descriptions corresponding to user DSR. The DSR domain problem descriptions (e.g., DSR domain problem description 1090A-1090C) may be fed into the DSR planner 1100 sequential, in batches, in preferential order (such as based on a ranking), etc. The DSR domain problem descriptions may be generated based on user DSR.

The DSR planner 1100 operates on each received DSR domain problem description (such as together with the current iterations of the DSR world model) to apply the DSR action calculus to the DSR domain problem description. The DSR planner 1100 generates atomic actions, resolves conflicts (e.g., logical, relational, temporal conflicts), including by generating alterative atomic actions, re-ordering the atomic actions, duplicating atomic actions, generating additional atomic actions, etc. The DSR planner 1100 resolves conflicts and creates a sequence of atomic actions.

The DSR planner 1100 serializes the sequence of atomic actions, including by grouping atomic actions by actor. The DSR planner 1100 generates one or more workflow, such as a workflow for each of the received DSR domain problem descriptions. The DSR planner 1100 outputs, as a set of serialized atomic actions 1110A-1110N based on the respective input DSR domain problem descriptions. The DSR planner 1100 may generate workflows as DSR domain problem descriptions are provided, where workflows for each of the respective input DSR domain problem descriptions may or may not overlap (e.g., temporally). The DSR planner 1100 may update a previous workflow (e.g., parts of a previous workflow not yet completed) based on a subsequent workflow. In some embodiments, the DSR planner 1100 may output a workflow corresponding to multiple DSR domain problem descriptions. For example, the DSR planner 1100 may receive two user DSR requests, identical except in the user identity. The DSR planner 1100 may output a single workflow containing atomic actions corresponding to both user DSR.

Figure 10D:
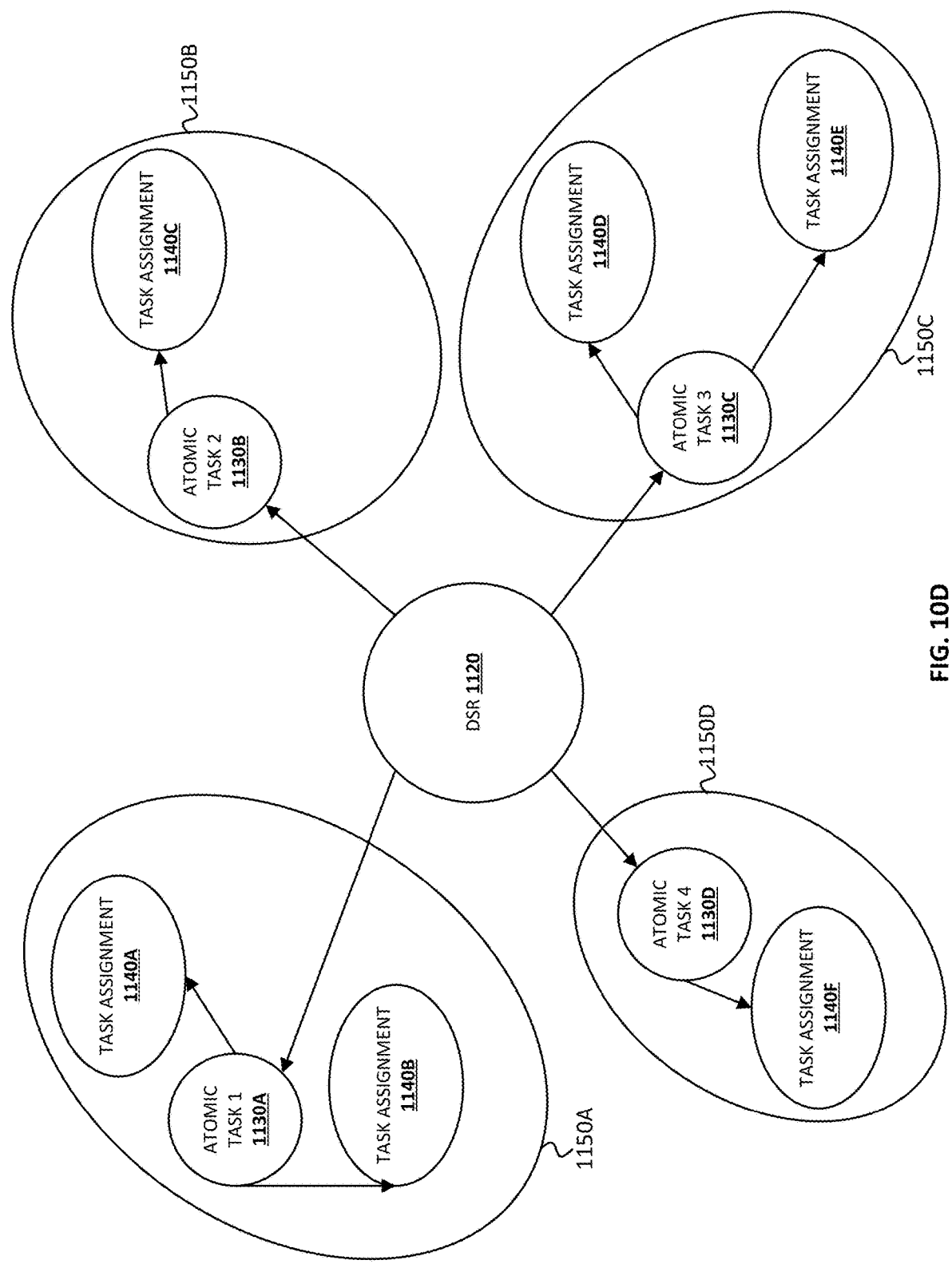

FIG. 10D depicts a schematic representation of division of a user's data subject request (DSR) 1120 into a set of automatically generated workflows 1150A-1150D. The user DSR may be any appropriate DSR, such as those described herein. The user DSR 1120 may be processed by the DSR processing engine to generate a set of workflows (e.g., the automatically generated workflows 1150A-1150D), where each workflow has at least one atomic task (e.g., atomic task 1 1130A, atomic task 2 1130B, atomic task 3 1130C, atomic task 4 1130D) and at least one task assignment 1140A-1140E. Each workflow may have one or more task assignment. In some embodiments, a workflow may contain more than one atomic task.

FIG. 11 is a diagram that illustrates an exemplary computing system 1200 in accordance with embodiments of the present technique. Various portions of systems and methods described herein, may include or be executed on one or more computing systems similar to computing system 1200. Further, processes and modules described herein may be executed by one or more processing systems similar to that of computing system 1200.

Computing system 1200 may include one or more processors (e.g., processors 1210-1-1210-N) coupled to system memory 1220, an input/output (I/O) device 1206 via an input/output (I/O) device interface 1230, and a network 1260 via a network interface 1240 through an input/output (I/O) interface 1250. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1200. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1220). Computing system 1200 may be a uni-processor system including one processor (e.g., processor 1210-1), or a multi-processor system including any number of suitable processors (e.g., 1210-1-1210-N). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1200 may include a plurality of computing devices (e.g., distributed computing systems) to implement various processing functions.

I/O devices may include devices that receive input (e.g., from a user) or output information (e.g., to a user). I/O devices 1206 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1206 may be connected to computing system 1200 through a wired or wireless connection. I/O devices 1206 may be connected to computing system 1200 from a remote location. I/O devices 1206 located on remote computer system, for example, may be connected to computing system 1200 via a network, e.g., network(s) 1260, and network interface 1240.

Network interface 1240 may include a network adapter that provides for connection of computing system 1200 to a network. Network interface 1240 may facilitate data exchange between computing system 1200 and other devices connected to the network. Network interface 1240 may support wired or wireless communication. The network, such as for example network(s) 1260, may include an electronic communication network, such as the Internet, a local area network (LAN), a wide area network (WAN), a cellular communications network, or the like.

System memory 1220 may be configured to store program instructions 1222 or data 1224. Program instructions 1222 may be executable by a processor (e.g., one or more of processors 1210-1-1210-N) to implement one or more embodiments of the present techniques. Program instructions 1222 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1220 may include a tangible program carrier having program instructions stored thereon. A tangible program carrier may include a non-transitory computer readable storage medium. A non-transitory computer readable storage medium may include a machine-readable storage device, a machine-readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random-access memory (SRAM), synchronous dynamic RAM (SDRAM)), bulk storage memory (e.g., CD-ROM and/or DVD-ROM, hard-drives), or the like. System memory 1220 may include a non-transitory computer readable storage medium that may have program instructions stored thereon that are executable by a computer processor (e.g., one or more of processors 1210-1-1210-N) to cause the subject matter and the functional operations described herein. A memory (e.g., system memory 1220) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1250 may be configured to coordinate I/O traffic between processors 1210-1-1210-N, system memory 1220, network interface 1240, I/O devices 1206, and/or other peripheral devices. I/O interface 1250 may perform protocol, timing, or other data transformations to convert data signals from one component (e.g., system memory 1220) into a format suitable for use by another component (e.g., processors 1210-1-1210-N). I/O interface 1250 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computing system 1200 or multiple computing systems 1200 configured to host different portions or instances of embodiments. Multiple computing systems 1200 may provide for parallel or sequential processing/execution of one or more portions of the techniques described herein.

Those skilled in the art will appreciate that computing system 1200 is merely illustrative and is not intended to limit the scope of the techniques described herein. Computing system 1200 may include any combination of devices or software that may perform or otherwise provide for the performance of the techniques described herein. For example, computing system 1200 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computing system 1200 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computing system 1200 may be transmitted to computing system 1200 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g., within a data center or geographically), or otherwise differently organized. The functionality described herein may be provided by one or more processors of one or more computers executing code stored on a tangible, non-transitory, machine-readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may be provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the drawings are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include," "including," and "includes" and the like mean including, but not limited to. As used throughout this application, the singular forms "a," "an," and "the" include plural referents unless the content explicitly indicates otherwise. Thus, for example, reference to "an element" or "a element" includes a combination of two or more elements, notwithstanding use of other terms and phrases for one or more elements, such as "one or more." The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Similarly, reference to "a computer system" performing step A and "the computer system" performing step B can include the same computing device within the computer system performing both steps or different computing devices within the computer system performing steps A and B. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square," "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation. As is the case in ordinary usage in the field, data structures and formats described with reference to uses salient to a human need not be presented in a human-intelligible format to constitute the described data structure or format, e.g., text need not be rendered or even encoded in Unicode or ASCII to constitute text;

images, maps, and data-visualizations need not be displayed or decoded to constitute images, maps, and data-visualizations, respectively; speech, music, and other audio need not be emitted through a speaker or decoded to constitute speech, music, or other audio, respectively. Computer implemented instructions, commands, and the like are not limited to executable code and can be implemented in the form of data that causes functionality to be invoked, e.g., in the form of arguments of a function or API call.

In this patent, to the extent any U.S. patents, U.S. patent applications, or other materials (e.g., articles) have been incorporated by reference, the text of such materials is only incorporated by reference to the extent that no conflict exists between such material and the statements and drawings set forth herein. In the event of such conflict, the text of the present document governs, and terms in this document should not be given a narrower reading in virtue of the way in which those terms are used in other materials incorporated by reference.

The present techniques will be better understood with reference to the following enumerated embodiments:

1. A method of providing a user with access to Compliance Data Subject Request (DSR) processing across a domain comprising a network of servers that are administratively related and coupled, and user-accessible by each of a plurality of users, the servers in the network of servers each including memory for storing compliance data relating to Compliance Data Subject Requests and a processor for executing instructions, the method comprising: providing a executable planning model that comprises a DSR domain description language, a DSR action description language, a plurality of DSR problem descriptions, a plurality of predetermined logical, relational, and temporal constraints and a plurality of dependency constraints; wherein the DSR domain description language includes an object hierarchy representing various objects and their inter-relationship within the domain; wherein the DSR action description language includes DSR actions, the DSR actions comprising at least DELETE, REMOVE, OBFUSCATE, and ANONYMIZE, and at least one or more of ENCRYPT, MARK NOT USE, MARK NOT SHARE, AND MARK NOT PROFILE; and wherein the DSR problem descriptions each correspond to an operation that operates upon a compliance object using at least one of the DSR actions; receiving from one of the plurality of users at the network a user DSR request that includes therein a user object on which DSR processing is required; and automatically processing the user DSR request by executing the executable planning model in the network, and wherein the executable planning model automatically implements an automatically derived set of lower-level machine-executable atomic DSR actions corresponding to the user DSR request.
2. The method of embodiment 1, wherein providing the executable planning model further comprises describing the domain and the object hierarchy of the domain with the DSR domain description language.
3. The method of embodiments 1 or 2, wherein automatically processing the user DSR request comprises generating a DSR problem description based on the DSR domain language and the user DSR request.
4. The method of any one of embodiments 1 to 3, wherein automatically processing the user DSR request comprises determining the set of lower-level machine-executable atomic DSR actions based on the DSR action language and the DSR problem description.
5. The method of any one of embodiments 1 to 4, wherein automatically processing the user DSR request comprises automatically determining a sequential order of the set of lower-level machine-executable atomic DSR actions based a DSR action calculus.
6. The method of embodiment 5, wherein automatically determining a sequential order of the set of lower-level machine-executable atomic DSR actions based on a DSR action calculus comprises: determining a set of lower-level machine-executable atomic DSR actions based on the DSR action language; and based on the plurality of predetermined logical, relational, and temporal constraints and the plurality of dependency constraints and the DSR action calculus, ordering the set of lower-level machine-executable atomic DSR actions.
7. The method of embodiment 6, wherein at least some of the plurality of predetermined logical, relational, and temporal constraints relate two or more of the set of lower-level machine-executable atomic DSR actions.
8. The method of any one of embodiments 5 to 7, wherein automatically processing the user DSR request comprises automatically determining a set of DSR actions, wherein each of the DSR actions receives an object classification for the user object, and based on the DSR action and the object classification determining a set of constraints for the user object.
9. The method of embodiment 8, wherein the set of constraints for the user object are determined by the object classification, the plurality of predetermined logical, relational, and temporal constraints and the plurality of dependency constraints, and the action calculus.
10. The method of embodiment 8, wherein the set of constraints for the user object describe a relationship between the user object and other objects of the domain.
11. The method of any one of embodiments 1 to 10, wherein the DSR action OBFUSCATE obeys a data privacy obfuscation mandate.
12. The method of any one of embodiments 1 to 11, wherein the DSR action ANONYMIZE obeys a data privacy anonymization mandate.
13. The method of any one of embodiments 1 to 12, wherein the DSR action REMOVE obeys a data privacy removal mandate.
14. The method of any one of embodiments 1 to 13, wherein automatically processing the user DSR request comprises obeying a given data privacy mandate from a set of data privacy mandates, the set of data privacy mandates including at least one of GDPR, HIPAA, CPRA, COPPA, FERPA, GLBA, FCRA, and DPDPB.
15. The method of any one of embodiments 1 to 14, wherein the user DSR request comprises a data privacy mandate dependent user DSR request.
16. The method of any one of embodiments 1 to 15, further comprising displaying, to the plurality of users, a status for the processing of the user DSR request.
17. The method of any one of embodiments 1 to 16, wherein the automatically derived set of lower-level machine-executable atomic DSR actions comprise multiple sets of lower-level machine-executable atomic DSR actions, each of the multiple sets associated with an actor, each actor having permissions for one or more of the network of servers, wherein the multiple sets are determined based on a relational map between the one or more of the network of servers and actors.

18. The method of any one of embodiments 1 to 17, further comprising sending as a workflow at least some of the set of lower-level machine-executable atomic DSR actions to an actor associated with at least one of the network of server, the actor having authorization to perform tasks for the at least one of the network of servers.

19. A server comprising: memory for storing compliance data relating to Compliance Data Subject Requests (DSR); a processor; and one or more non-transitory, machine-readable medium having instructions thereon, the instructions when executed by a processor to: provide an executable planning model that comprises a DSR domain description language, a DSR action description language, a plurality of DSR problem descriptions, a plurality of predetermined logical, relational, and temporal constraints and a plurality of dependency constraints; wherein the DSR domain description language includes an object hierarchy representing various objects and their inter-relationship within a domain, the domain comprising a network of servers that are administratively related and coupled, and user-accessible by each of a plurality of users; wherein the DSR action description language includes at least DELETE, REMOVE, OBFUSCATE, ENCRYPT, and ANONYMIZE, and at least one or more of MARK NOT USE, MARK NOT SHARE, and MARK NOT PROFILE actions; and wherein the DSR problem descriptions each correspond to an operation that operates upon a compliance object using at least one of the DSR actions; receive from one of the plurality of users at the network a user DSR request that includes therein a user object on which DSR processing is required; and automatically process the user DSR request by executing the executable planning model in the network, and wherein the executable planning model automatically implements an automatically derived set of lower-level machine-executable atomic DSR actions corresponding to the user DSR request.

20. A system comprising: one or more data store for storing compliance data relating to Compliance Data Subject Requests (DSRs); a compliance server, wherein the one or more data servers and the compliance server comprise a domain that is administratively related and coupled, and user-accessible by each of a plurality of users, the compliance server comprising: memory for storing compliance data relating to DSRs; a processor; and one or more non-transitory, machine-readable medium having instructions thereon, the instructions when executed by a processor to: provide an executable planning model that comprises a DSR domain description language, a DSR action description language, a plurality of DSR problem descriptions, a plurality of predetermined logical, relational, and temporal constraints and a plurality of dependency constraints; wherein the DSR domain description language includes an object hierarchy representing various objects and their inter-relationships within the domain; wherein the DSR action description language includes at least DELETE, REMOVE, OBFUSCATE, ENCRYPT, and ANONYMIZE, and at least one or more of MARK NOT USE, MARK NOT SHARE, and MARK NOT PROFILE actions; and wherein the DSR problem descriptions each correspond to an operation that operates upon a compliance object using at least one of the DSR actions; receive from one of the plurality of users at the domain a user DSR request that includes therein a user object on which DSR processing is required; and automatically process the user DSR request by executing the executable planning model in the domain, and wherein the executable planning model automatically implements an automatically derived set of lower-level machine-executable atomic DSR actions corresponding to the user DSR request.

The invention claimed is:

1. A method of Data Subject Request (DSR) compliance processing across a domain comprising at least a server, the server including memory for storing data relating to Data Subject Requests and a processor for executing instructions, the method comprising:
   accessing an executable planning model that comprises a domain description language, an action description language, one or more logical, relational, and/or temporal constraints and one or more dependency constraints;
   wherein the domain description language includes an object hierarchy between at least two objects within the domain; and
   wherein the action description language includes at least one action, the at least one action comprising at least one of DELETE, REMOVE, OBFUSCATE, ANONYMIZE, ENCRYPT, MARK NOT USE, MARK NOT SHARE, and MARK NOT PROFILE;
   receiving a DSR that corresponds to one or more objects for DSR processing; and
   automatically processing the DSR by executing the executable planning model, and wherein the executable planning model automatically generates a set of lower-level machine-executable actions corresponding to the DSR.

2. The method of claim 1, further comprising generating the executable planning model.

3. The method of claim 2, wherein generating the executable planning model comprises describing the domain and the object hierarchy thereof in the domain description language.

4. The method of claim 1, wherein automatically processing the DSR comprises generating a problem description based on the domain description language and the DSR.

5. The method of claim 1, wherein automatically processing the DSR comprises automatically determining a sequential order of the set of lower-level machine-executable actions based an action calculus.

6. The method of claim 5, wherein automatically determining the sequential order of the set of lower-level machine-executable actions based on the action calculus comprises:
   determining the set of lower-level machine-executable actions based on the action description language; and
   based on at least one of the one or more logical, relational, and/or temporal constraints and the one or more dependency constraints and the action calculus, ordering the set of lower-level machine-executable actions.

7. The method of claim 6, wherein at least one of the one or more logical, relational, and/or temporal constraints are related to two or more of the set of lower-level machine-executable actions.

8. The method of claim 1, wherein automatically processing the DSR comprises determining a set of actions, wherein each of the actions corresponds to an object class, and based on a given action of the set of actions and the object class of the object determining a set of constraints for the one or more objects.

9. The method of claim 8, wherein the set of constraints for the one or more objects are determined based on at least one of the object class, the one or more logical, relational, and/or temporal constraints and the one or more dependency constraints, and an action calculus.

10. The method of claim 8, wherein the set of constraints for the one or more objects describe a relationship between the one or more objects and other objects of the domain.

11. The method of claim 1, wherein the action OBFUSCATE comprises at least one of partial and/or whole replacement, minimization, substitution, masking, encryption, truncation, shuffling, renaming, tokenization, nulling, application of noise, and randomization for at least one of the one or more objects.

12. The method of claim 11, wherein the action OBFUSCATE is reversible.

13. The method of claim 1, wherein the action ANONYMIZE comprises partial and/or whole removal of identifying information for at least one of the one or more objects.

14. The method of claim 13, wherein the action ANONYMIZE comprises partial and/or whole removal of identifying information and/or identity-inferring information for at least one or the one or more objects.

15. The method of claim 1, wherein the action REMOVE comprises at least one of partial and/or whole deletion, nullification, overwriting, erasing, and sanitization for at least one of the one or more objects.

16. The method of claim 15, wherein the action REMOVE further comprises at least one of partial and/or whole deletion, nullification, overwriting, erasing, and sanitization for at least one additional object within the domain other than the one or more objects.

17. The method of claim 1, wherein the executable planning model automatically generates multiple sets of lower-level machine-executable actions, each of the multiple sets associated with an actor having permissions for one or more regions of the domain, wherein the multiple sets are determined based on a relational map between the actors and the regions of the domain of the lower-level machine-executable actions.

18. The method of claim 1, further comprising sending a workflow with a subset of the set of lower-level machine-executable actions to an actor, the subset of the lower-level machine-executable actions associated with a region of the domain and the actor having authorization for the region of the domain.

19. A system comprising:
one or more memories for storing data relating to Data Subject Requests (DSR);
a processor; and
one or more non-transitory, machine-readable medium having instructions thereon, the instructions when executed by a processor to:
accessing an executable planning model that comprises a domain description language, an action description language, one or more logical, relational, and/or temporal constraints and one or more dependency constraints;
wherein the domain description language includes an object hierarchy between at least two objects within the one or more memories;
wherein the action description language includes at least one of DELETE, REMOVE, OBFUSCATE, ENCRYPT, ANONYMIZE, MARK NOT USE, MARK NOT SHARE, and MARK NOT PROFILE actions; and
receive a DSR that corresponds to one or more objects for DSR processing; and
automatically process the DSR by executing the executable planning model, and wherein the executable planning model automatically generates a set of lower-level machine-executable actions corresponding to the DSR.

20. A method of Data Subject Request (DSR) compliance processing across a domain comprising at least a server, the server including or in communication with memory for storing data relating to DSRs and a processor for executing instructions, the method comprising:
receiving a DSR that corresponds to one or more objects for DSR processing; and
automatically processing the DSR by executing a executable planning model, wherein the executable planning model automatically generates a set of lower-level machine-executable actions corresponding to the DSR.
wherein the executable planning model comprises a domain description language and an action description language,
wherein the domain description language includes an object hierarchy between at least two objects within the domain; and
wherein the action description language includes at least one action, the at least one action comprising at least one of DELETE, REMOVE, OBFUSCATE, ANONYMIZE, ENCRYPT, MARK NOT USE, MARK NOT SHARE, and MARK NOT PROFILE.

* * * * *